(12) United States Patent
Lee et al.

(10) Patent No.: US 8,948,109 B2
(45) Date of Patent: Feb. 3, 2015

(54) METHOD AND A BASE STATION FOR CONTROLLING DOWNLINK TRANSMISSION POWER, AND A METHOD AND A USER EQUIPMENT FOR RECEIVING A PDSCH

(75) Inventors: Moon Il Lee, Anyang-si (KR); Jae Hoon Chung, Anyang-si (KR); Hyun Soo Ko, Anyang-si (KR); Bin Chul Ihm, Anyang-si (KR)

(73) Assignee: LG Electronics Inc., Seoul (KR)

( * ) Notice: Subject to any disclaimer, the term of this patent is extended or adjusted under 35 U.S.C. 154(b) by 236 days.

(21) Appl. No.: 13/508,507

(22) PCT Filed: Nov. 4, 2010

(86) PCT No.: PCT/KR2010/007736
§ 371 (c)(1),
(2), (4) Date: May 7, 2012

(87) PCT Pub. No.: WO2011/055989
PCT Pub. Date: May 12, 2011

(65) Prior Publication Data
US 2012/0224555 A1    Sep. 6, 2012

Related U.S. Application Data

(60) Provisional application No. 61/259,200, filed on Nov. 8, 2009.

(51) Int. Cl.
*H04W 52/16* (2009.01)
*H04W 52/24* (2009.01)
*H04W 52/14* (2009.01)
*H04W 52/42* (2009.01)

(52) U.S. Cl.
CPC ............ *H04W 52/143* (2013.01); *H04W 52/16* (2013.01); *H04W 52/42* (2013.01)
USPC .......................................... 370/329; 370/260

(58) Field of Classification Search
USPC ................. 370/252, 311, 328, 329, 335, 342; 455/69, 423, 522
See application file for complete search history.

(56) References Cited

U.S. PATENT DOCUMENTS

2007/0149238 A1*   6/2007   Das et al. ...................... 455/522
2007/0153744 A1*   7/2007   Goldberg ...................... 370/334

(Continued)

OTHER PUBLICATIONS

R1-091757, "Further considerations on UE-specific reference symbol multiplexing for LTE-Advanced downlink", 3GPP TSG-RAN WG1 #57, May 4-8, 2009.

(Continued)

*Primary Examiner* — Andrew Chriss
*Assistant Examiner* — John Lequang
(74) *Attorney, Agent, or Firm* — McKenna Long & Aldridge LLP

(57) ABSTRACT

A ratio of data transmission power of a layer per RE to RS transmission power of the layer per RE is predefined according to rank. A BS determines downlink transmission power for a PDSCH according to the predefined rank and a UE assumes that the PDSCH and UE-specific RS(s) for the PDSCH is transmitted with power satisfying the ratio.

8 Claims, 20 Drawing Sheets

(56) References Cited

U.S. PATENT DOCUMENTS

| | | | |
|---|---|---|---|
| 2008/0307427 A1* | 12/2008 | Pi et al. | 718/104 |
| 2010/0061360 A1* | 3/2010 | Chen et al. | 370/342 |
| 2010/0254471 A1* | 10/2010 | Ko et al. | 375/260 |
| 2010/0285792 A1* | 11/2010 | Chen et al. | 455/422.1 |
| 2011/0098054 A1* | 4/2011 | Gorokhov et al. | 455/452.1 |
| 2011/0176502 A1* | 7/2011 | Chung et al. | 370/329 |
| 2011/0274047 A1* | 11/2011 | Kwon et al. | 370/328 |
| 2012/0002740 A1* | 1/2012 | Han et al. | 375/260 |

OTHER PUBLICATIONS

R4-080637, "TP for 36.104, DL RS power", 3GPP TSG-RAN Working Group 4 Meeting #46bis, Mar. 31-Apr. 4, 2008.

R1-092189, "Discussions on DM-RS Design for LTE-A", 3GPP TSG-RAN WG1 meeting #57, May 4-8, 2009.

R1-093945, "Joint considerations of DL DM-RS design and codeword-layer mapping for rank over 3", 3GPP TSG-RAN WG1 meeting #58b, Oct. 12-16, 2009.

* cited by examiner

Fig. 10
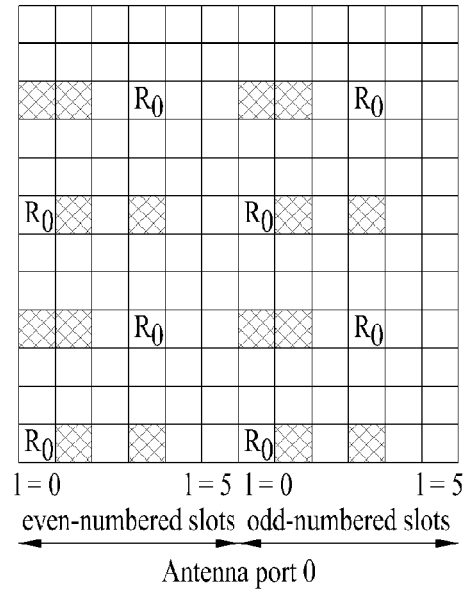
Antenna port 0
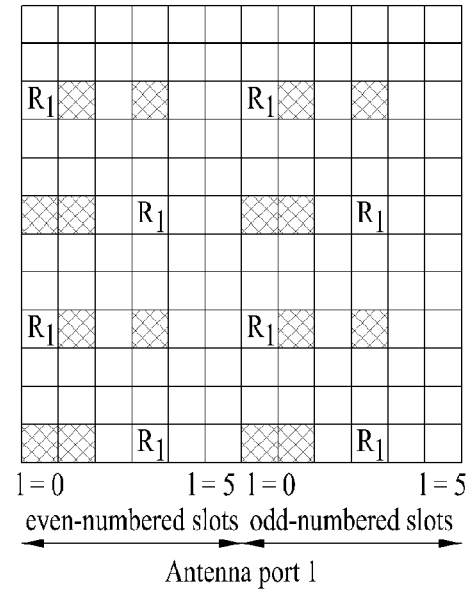
Antenna port 1
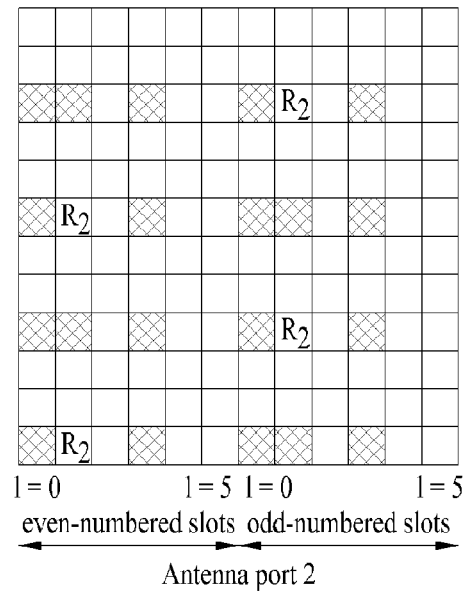
Antenna port 2
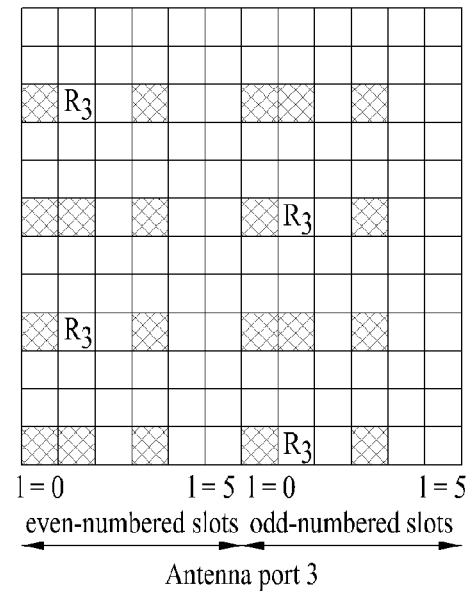
Antenna port 3
$R_0$ : CRS for antenna port 0
$R_1$ : CRS for antenna port 1
$R_2$ : CRS for antenna port 2
$R_3$ : CRS for antenna port 3

Fig. 11
(a) Normal CP
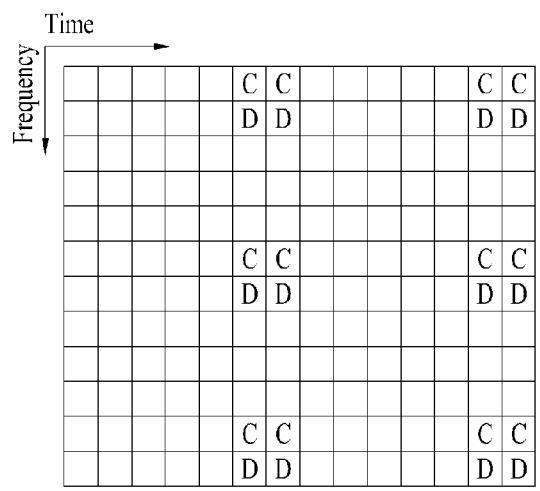
C : CDM group 1   D : CDM group 2
(b) Extended CP
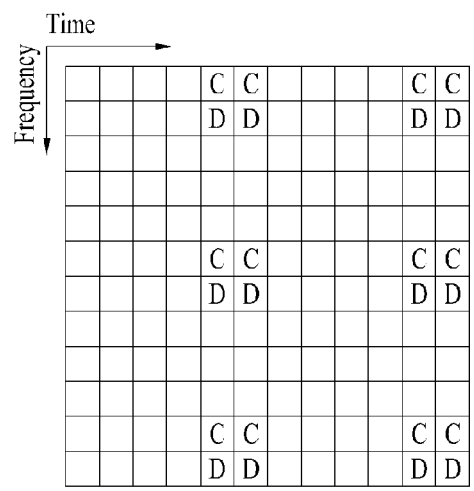
C : CDM group 1   D : CDM group 2

Fig. 13
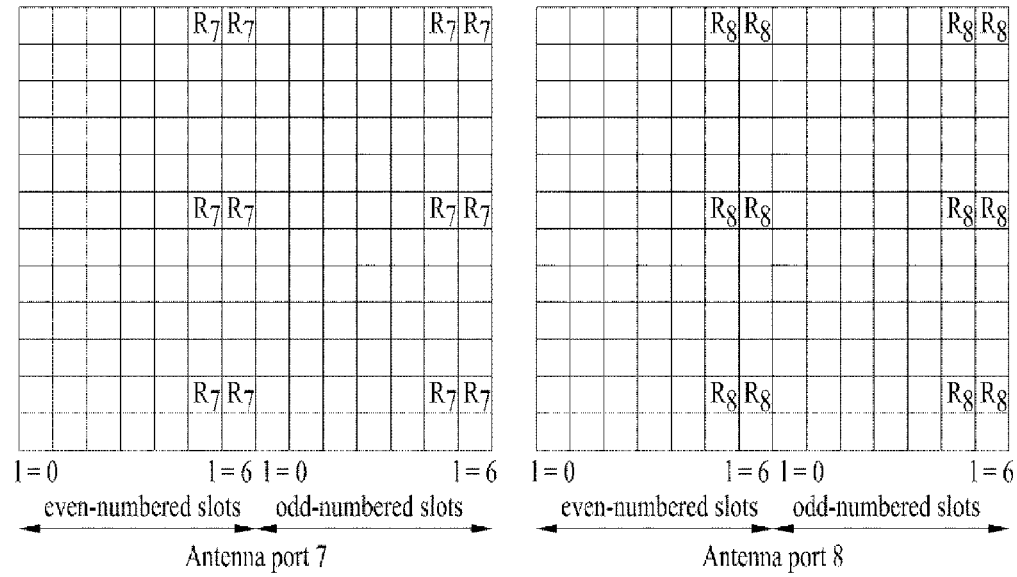
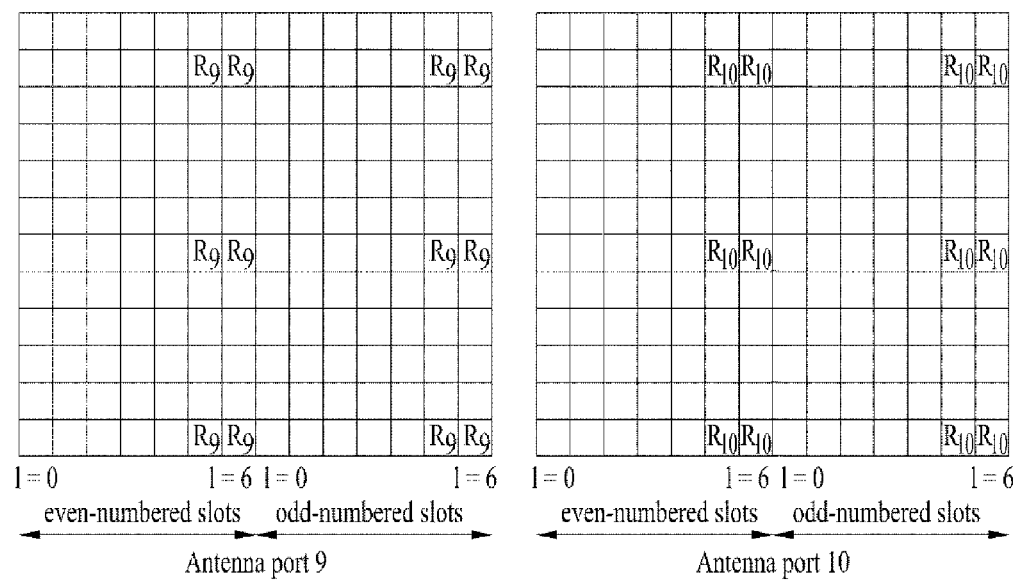
Fig. 14
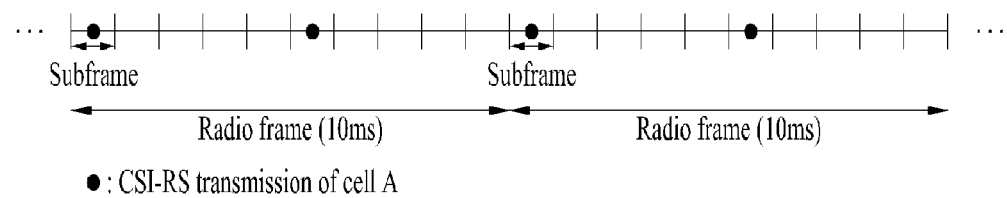

METHOD AND A BASE STATION FOR CONTROLLING DOWNLINK TRANSMISSION POWER, AND A METHOD AND A USER EQUIPMENT FOR RECEIVING A PDSCH

This Application is a 35 U.S.C. §371 National Stage entry of International Application No. PCT/KR2010/007736, filed Nov. 4, 2010, and claims the benefit of U.S. Provisional Application No. 61/259,200, filed Nov. 8, 2009, both of which are incorporated by reference in their entirety herein.

TECHNICAL FIELD

The present invention relates to a wireless communication system, and more particularly, to a method and an apparatus for controlling downlink transmission power to resource elements and a method and an apparatus for receiving signals transmitted the downlink transmission power.

BACKGROUND ART

Future-generation multimedia wireless communication systems, which are a recent active research area, require processing of various types of information including video data and wireless data at high data rates, beyond the traditional voice-oriented service.

Owing to its advantage of high data rate, Orthogonal Frequency Division Multiplexing (OFDM) has recently attracted much attention. OFDM is a special case of Multi-Carrier Modulation (MCM) in which a frequency band is divided into multiple orthogonal subcarriers and data is transmitted on the subcarriers. The low complexity of OFDM reduces inter-symbol interference. In OFDM, an input serial sequence of data symbols is converted to N parallel data symbols and transmitted on N separate subcarriers.

Orthogonality is maintained among the subcarriers in the frequency domain. Each orthogonal channel experiences mutually independent frequency-selective fading and the resulting increase in the gap between transmitted symbols leads to minimum intersymbol interference. Orthogonal Frequency Division Multiple Access (OFDMA) is a multiple access scheme in which multiple accesses are allowed through independent allocation of part of available subcarriers to each user in an OFDM system. In OFDMA, it is typical to independently allocate frequency resources, namely subcarriers to a plurality of users in such a manner that the frequency resources are not overlapped with one another. As a result, allocation of frequency resources is mutually exclusive among users in OFDMA. The OFDMA system may achieve frequency diversity for multiple users by frequency selective scheduling and allocate subcarriers in various manners according to subcarrier permutation.

In the mean time, a base station (BS) can simultaneously transmit multiple layers for one or several users. To this end, the multiple data layers can be multiplexed into a certain frequency/time resource and transmitted to the one or several users on the certain frequency/time resource. In general, a maximum available transmit power is predetermined for downlink transmission of a BS according to a bandwidth supported by the BS, the throughput of the BS, the power efficiency of the BS, etc. It is required that the BS efficiently allocates transmit power per subcarrier in an OFDM symbol since a total transmit power available for the BS at a time is usually limited to a certain value. Besides, a UE should know the relationship between transmit power for data and transmit power for a reference signal in order to demodulate the data received from the BS.

Accordingly, there exists a need for a method for allocating transmit power efficiently in a BS, while simplifying the process of determining downlink transmit power or a power ratio between a data signal and a reference signal at a UE.

DISCLOSURE OF INVENTION

Technical Problem

Accordingly, the present invention is directed to a method for determining/allocating downlink transmission power for a PDSCH.

An object of the present invention is to provide a base station with effective methods for controlling downlink transmission power.

Also, an object of the present invention is to provide a user equipment with effective methods for demodulating downlink data transmitted with certain power.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Solution to Problem

The present invention relates to a wireless communication system. More particularly, the present invention relates to a power ratio between a data resource element (RE) and a user equipment specific (UE-specific) reference signal (RS) or a power ratio between a data RE in an OFDM symbol containing the UE-specific RS and a data RE in an OFDM symbol not containing the UE-specific RS. According to the present invention, a ratio of data transmission power of a layer per RE to RS transmission power of the layer per RE is predefined according to rank. A BS allocates transmission power according to the predefined ratio and a UE assumes that the PDSCH and UE-specific RS(s) for the PDSCH is transmitted with power satisfying the ratio.

To achieve these objects and other advantages and in accordance with the purpose of the invention, as embodied and broadly described herein, a method for controlling downlink transmission power in a base station (BS) in a wireless communication system is provided. The method comprises: determining data transmission power of a layer per resource element (RE) on which a physical downlink shared channel (PDSCH) is mapped and reference signal (RS) transmission power of a user equipment specific (UE-specific) RS of the layer per RE on which at least one UE-specific RS is mapped, so that a ratio of the data transmission power to the RS transmission power which is predefined according to rank indicating a number of layers being transmitted is constant within an OFDM symbol containing the at least one UE-specific RS; and transmitting the PDSCH and the at least one UE-specific RS according to the allocated power to a user equipment.

In another aspect of the present invention, a base station (BS) of controlling downlink transmission power is provided. The BS comprises: a transmitter configured to transmit a physical downlink shared channel (PDSCH) and at least one user equipment specific (UE-specific) reference signal for the PDSCH; and a processor, operatively coupled to the transmitter, configured to determine data transmission power of a layer per resource element (RE) on which a physical downlink shared channel (PDSCH) is mapped and reference signal (RS) transmission power of a user equipment specific (UE-specific) RS per RE on which at least one UE-specific RS is mapped, so that a ratio of the data transmission power to the RS transmission power which is predefined according to rank indicating a number of layers being transmitted is constant within an OFDM symbol containing the at least one UE-specific RS; and control the transmitter to transmit the PDSCH and the at least one UE-specific RS according to the allocated power to a user equipment.

In still another aspect of the present invention, a method for receiving a physical downlink channel (PDSCH) in a user equipment (UE) in a wireless communication system is provided. The method comprises: receiving the PDSCH and at least one UE-specific reference signal (RS) from a base station (BS); and demodulating each layer of the PDSCH based on a corresponding UE-specific RS for the each layer and a ratio of data transmission power to RS transmission power predefined according to rank indicating a number of layers transmitted by the BS, wherein the data transmission power is power of a layer per resource element (RE) on which the PDSCH is mapped and the RS transmission power is power of a UE-specific RS per RE on which on which at least one UE-specific RS is mapped.

In further still another aspect of the present invention, a user-equipment (UE) of receiving a physical downlink channel (PDSCH) in a wireless communication system is provided. The UE comprises: a receiver configured to receive the PDSCH and at least one UE-specific reference signal (RS) from a base station (BS); and a processor, operatively coupled to the receiver, configured to demodulate each layer of the PDSCH based on a corresponding UE-specific RS for the each layer and a ratio of data transmission power to RS transmission power predefined according to rank indicating a number of layers transmitted by the BS, wherein the data transmission power is power of a layer per resource element (RE) on which the PDSCH is mapped and the RS transmission power is power of a UE-specific RS per RE on which on which at least one UE-specific RS is mapped.

In each aspect of the present invention, the ratio of the data transmission power to the RS transmission power may be 1 for rank less than or equal to two and ½ for rank greater than two.

In each aspect of the present invention, PDSCH data of the layer may be transmitted with the data transmission power and the UE-specific RS of the layer may be transmitted with the RS transmission power through an antenna port.

The aforementioned technical solutions are only a part of the embodiments of the present invention, and various modifications to which technical features of the present invention are applied could be understood by the person with ordinary skill in the art to which the present invention pertains, based on the following detailed description of the present invention.

Advantageous Effects of Invention

According to the embodiments of the present invention, a UE can easily figure out a power ratio between a data RE and a UE-specific RE, and can demodulate a data signal received from the BS based on the power ratio.

Also, a BS can transmit layer(s) with full power, thereby improving system throughput and/or system coverage of the BS.

Also, even if a BS can transmit layer(s) with full power, the BS can explicitly or implicitly provide a UE with information indicating power offset or power ratio between a data RE and an RS RE, thereby allowing the UE to modulate data signals received from the BS with accuracy.

It is to be understood that both the foregoing general description and the following detailed description of the present invention are exemplary and explanatory and are intended to provide further explanation of the invention as claimed.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 7 illustrates a transmitter transmitting a precoded RS;

FIG. 10 illustrates examples of CRS patterns according to antenna ports;

FIG. 11 illustrates an example of DRS patterns in an LTE-A system;

FIG. 13 illustrates the resource elements used for DRSs for normal CP for antenna ports 7 to 10;

FIG. 14 illustrates an example of CSI-RS transmission with a duty cycle;

MODE FOR THE INVENTION

Figure 1:
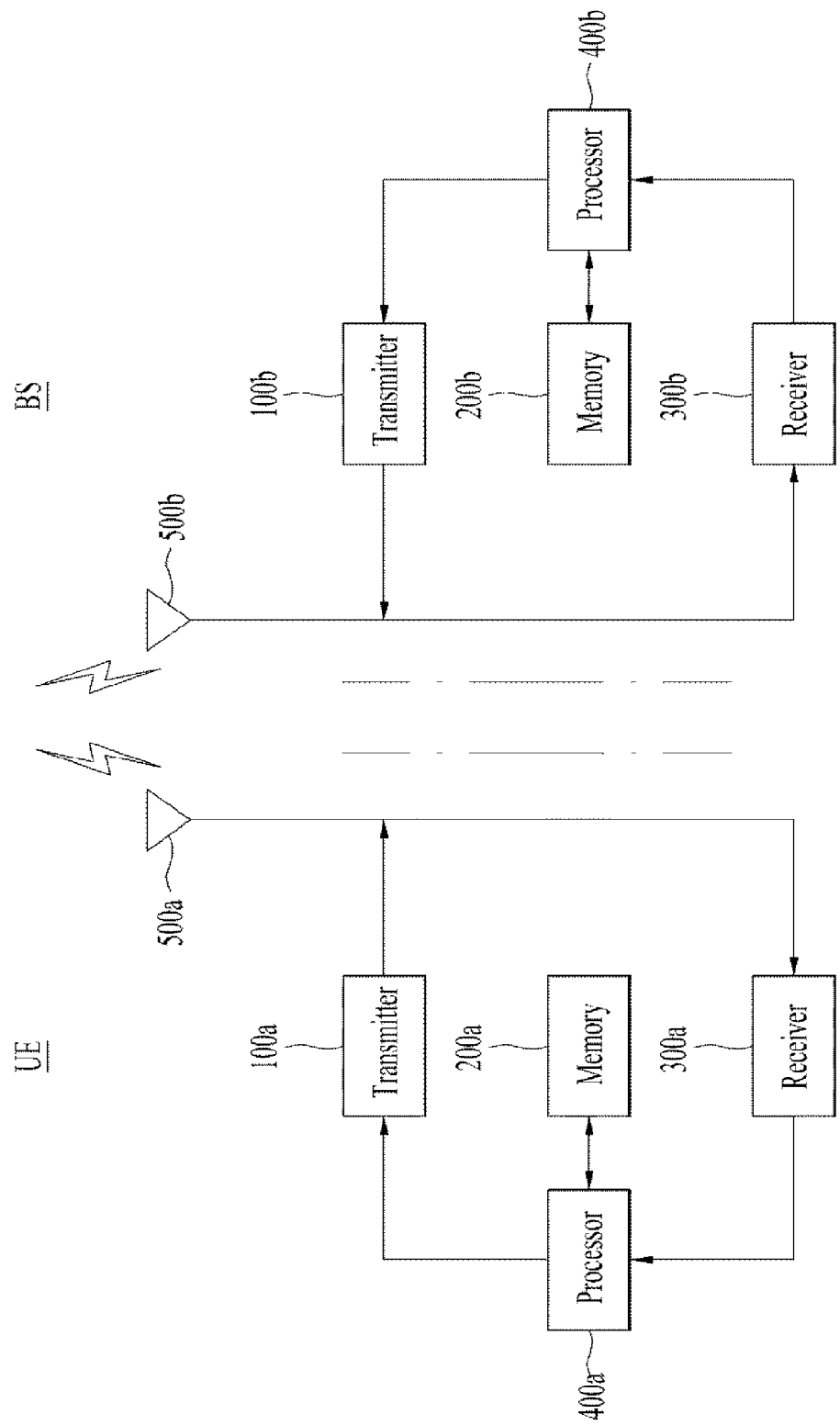
FIG. 1 is a block diagram illustrating a user equipment and a base station for implementing the present invention.

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters.

Techniques, apparatus and systems described herein can be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as Universal Terrestrial Radio Access (UTRA) or CDMA2000. The TDMA may be implemented with a radio technology such as Global System for Mobile communications (GSM)/ General Packet Radio Service (GPRS)/ Enhanced Data Rates for GSM Evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink and employs the SC-FDMA in uplink. LTE-advance (LTE-A) is an evolution of the 3GPP LTE. For clarity, this application focuses on the 3GPP LTE/LTE-A. However, technical features of the present invention are not limited thereto. For example, although the following description will be made based on a mobile communication system corresponding to a 3GPP LTE/LTE-A system, the following description can be applied to other mobile communication systems except unique features of the 3GPP LTE/LTE-A system.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a terminal equipment denotes a mobile or fixed type user terminal. Examples of the terminal equipment include various equipments that transmit and receive user data and/or various kinds of control information to and from a base station. The terminal equipment may be referred to as a user equipment (UE), a mobile station (MS), a mobile terminal (MT), a user terminal (UT), a subscriber station (SS), a wireless device, a personal digital assistant (PDA), a wireless modem, or a handheld device. Also, in the present invention, a base station (BS) means a fixed station that performs communication with a user equipment and/or another base station, and exchanges various kinds of data and control information with the user equipment and another base station. The base station may be referred to another terminology such as an evolved-NodeB (eNB), a base transceiver system (BTS), and an access point (AP).

A wireless communication system to which the embodiments of the present invention are applied includes a plurality of base stations. Each base station provides a communication service to user equipment(s) located in one or more specific local zones. The specific local zones are generally referred to as cells in the LTE/LTE-A system, and referred to as sectors in the IEEE 802.16. In IEEE 802.16, a local zone consisting of a plurality of sectors, which belong to one base station, is generally referred to as a cell.

Hereinafter, PDCCH/PCFICH/PHICH/PDSCH/DRS/CRS/UE-specific/CSI-RS RE represents an RE assigned to or available for PDCCH/PCFICH/PHICH/PDSCH/DRS/CRS/UE-specific/CSI-RS. The PDSCH RE or an RE not assigned to a reference signal is also referred to as a data RE. An RE carrying or assigned to a reference signal is referred to as an RS RE.

Meanwhile, in the present invention, if the specific signal is allocated to frame/subframe/slot/symbol/carrier/subcarrier, it means that the specific signal is transmitted through the corresponding carrier/subcarrier during a period/timing of the corresponding frame/subframe/slot/symbol.

Hereinafter, if a specific signal within frame/subframe/slot/symbol/carrier/subcarrier is not transmitted from its transmission location, it will be expressed that transmission of the specific signal has been dropped, muted, null or blanked.

Meanwhile, a UE implemented according to LTE standard will be referred to as LTE UE or legacy UE, and a UE implemented according to LTE-A standard will be referred to as LTE-A UE, advanced UE or evolved UE.

FIG. 1 is a block diagram illustrating a user equipment and a base station for implementing the present invention.

The user equipment (UE) serves as a transmitting apparatus on the uplink and as a receiving apparatus on the downlink. By contrast, the base station (BS) may serve as a receiving apparatus on the uplink and as a transmitting apparatus on the downlink.

The UE and the BS include antennas 500a and 500b for receiving information, data, signals, and/or messages, transmitters 100a and 100b for transmitting messages by controlling the antennas 500a and 500b, receivers 300a and 300b for receiving messages by controlling the antennas 500a and 500b, and memories 200a and 200b for storing information associated with communication in the wireless communication system. The UE and the BS further include processors 400a and 400b, respectively, which are adapted to perform the present invention by controlling the components of the UE and the BS, such as the transmitters 100a and 100b, the receivers 300a and 300b, and the memories 200a and 200b. The transmitter 100a, the memory 200a, the receiver 300a, and the processor 400a in the UE may be configured as independent components by separate chips or their separate chips may be incorporated into a single chip. Likewise, the transmitter 100b, the memory 200b, the receiver 300b, and the processor 400b in the BS may be configured as independent components on separate chips or their separate chips may be incorporated into a single chip. The transmitter and the receiver may be configured as a single transceiver or a radio frequency (RF) module in the UE or the BS.

The antennas 500a and 500b transmit signals generated from the transmitters 100a and 100b to the outside, or transfer radio signals received from the outside to the receivers 300a and 300b. The antennas 500a and 500b can be referred as antenna ports. Each antenna port can correspond to one physical antenna or can be configured by a combination of more than one physical antenna. If the transmitters 100a and 100b and/or the receivers 300a and 300b support a Multiple Input Multiple Output (MIMO) function using a plurality of antennas, each of them may be connected to two or more antennas.

The processors 400a and 400b generally provide overall control to the modules of the UE and the BS. Especially, the processors 400a and 400b may carry out a control function for performing the present invention, a Medium Access Control (MAC) frame variable control function based on service characteristics and a propagation environment, a power saving mode function for controlling idle-mode operations, a handover function, and an authentication and encryption function. The processors 400a and 400b may also be referred to as controllers, microcontrollers, microprocessors, microcomputers, etc. The processors 400a and 400b may be achieved by hardware, firmware, software, or their combination. In a hardware configuration, the processors 400a and 400b may be provided with one or more Application Specific Integrated Circuits (ASICs), Digital Signal Processors (DSPs), Digital Signal Processing Devices (DSPDs), Programmable Logic Devices (PLDs), and/or Field Programmable Gate Arrays (FPGAs), for implementing the present invention. In a firmware or software configuration, firmware or software may be configured to include a module, a procedure, a function, etc. for performing functions or operations of the present invention. This firmware or software may be provided in the processors 400a and 400b, or may be stored in the memories 200a and 200b and driven by the processors 400a and 400b.

The transmitters 100a and 100b perform predetermined coding and modulation for signals and/or data, which are scheduled by schedulers connected with the processors 400a and 400b and transmitted to the outside, and then transfer the modulated signals and/or data to the antennas 500a and 500b. For example, the transmitters 100a and 100b convert a transmission data stream to K layers by demultiplexing, channel coding, modulation, etc. The K layers are transmitted through the antennas 500a and 500b after being processed in transmission processors of the transmitters 100a and 100b. The transmitters 100a and 100b and the receivers 300a and 300b of the UE and the BS may be configured in different manners depending on the procedures of processing transmitted signals and received signals.

Figure 2:
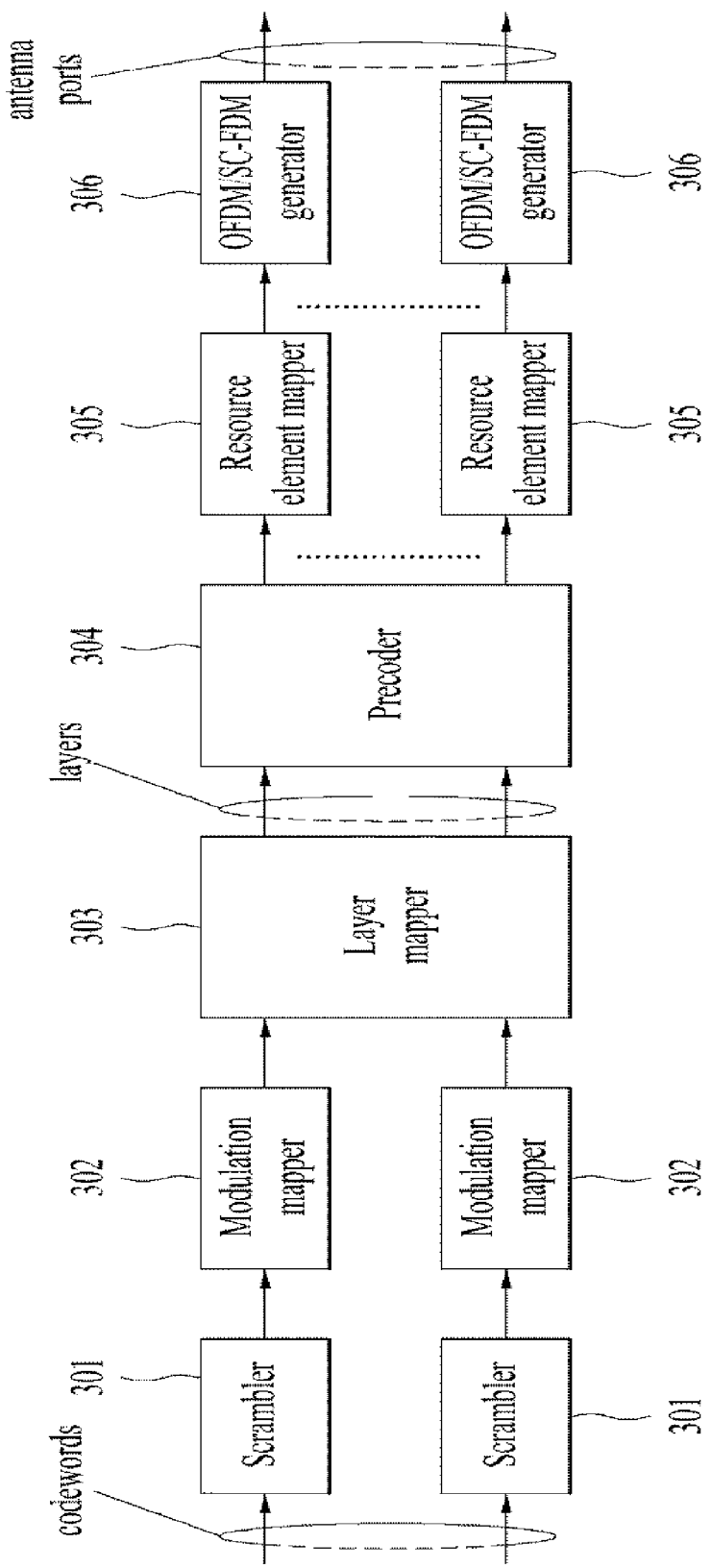
FIG. 2 is a block diagram illustrating an example of a transmitter in each of the UE and the BS.

FIG. 2 is a block diagram illustrating an example of a transmitter in each of the UE and the BS. Operations of the transmitters 100a and 100b will be described below in more detail with reference to FIG. 2.

Referring to FIG. 2, each of the transmitters 100a and 100b includes a scrambler 301, a modulation mapper 302, a layer mapper 303, a precoder 304, resource element mappers 305, OFDM/SC-FDM signal generators 306.

Each of the transmitters 100a and 100b can transmit more than one codewords. Coded bits in each codeword are scrambled by the scrambler 301 to be transmitted on a physical channel.

The scrambled bits are modulated by the modulation mapper 302 to generate complex-valued modulation symbols. The modulation mappers 302 modulate the scrambled bits to be arranged as complex-valued modulation symbols representing positions on a signal constellation in a predetermined modulation scheme. The modulation scheme may be, but not limited to, any of m-Phase Shift Keying (m-PKS) and m-Quadrature Amplitude Modulation (m-QAM).

The complex-valued modulation symbols are mapped onto one or several transmission layers by the layer mappers 303. The layer mappers 303 can map complex-valued modulation symbols of each codeword according to Table 1 or Table 2, for instance.

Table 1 shows codeword-to-layer mapping for spatial multiplexing and Table 2 shows codeword-to-layer mapping for transmit diversity.

TABLE 1

| Number of layers | | Codeword-to-layer mapping $i = 0, 1, \ldots, M^{layer}_{symb} - 1$ | |
|---|---|---|---|
| 1 | 1 | $x^{(0)}(i) = d^{(0)}(i)$ | $M^{layer}_{symb} = M^{(0)}_{symb}$ |
| 2 | 1 | $x^{(0)}(i) = d^{(0)}(2i) x^{(1)}(i) = d^{(0)}(2i+1)$ | $M^{layer}_{symb} = M^{(0)}_{symb}/2$ |
| 2 | 2 | $x^{(0)}(i) = d^{(0)}(i) x^{(1)}(i) = d^{(1)}(i)$ | $M^{layer}_{symb} = M^{(0)}_{symb} = M^{(1)}_{symb}$ |
| 3 | 1 | $x^{(0)}(i) = d^{(0)}(3i) x^{(1)}(i) = d^{(0)}(3i+1) x^{(2)}(i) = d^{(0)}(3i+2)$ | $M^{layer}_{symb} = M^{(0)}_{symb}/3$ |
| 3 | 2 | $x^{(0)}(i) = d^{(0)}(i) x^{(1)}(i) = d^{(1)}(2i) X^{(2)}(i) = d^{(1)}(2i+1)$ | $M^{layer}_{symb} = M^{(0)}_{symb} = M^{(1)}_{symb}/2$ |
| 4 | 1 | $x^{(0)}(i) = d^{(0)}(4i) x^{(1)}(i) = d^{(0)}(4i+1) x^{(2)}(i) = d^{(0)}(4i+2) x^{(3)}(i) = d^{(0)}(4i+3)$ | $M^{layer}_{symb} = M^{(0)}_{symb}/4$ |
| 4 | 2 | $x^{(0)}(i) = d^{(0)}(2i) x^{(1)}(i) = d^{(0)}(2i+1) x^{(2)}(i) = d^{(1)}(2i) x^{(3)}(i) = d^{(1)}(2i+1)$ | $M^{layer}_{symb} = M^{(0)}_{symb}/2 = M^{(1)}_{symb}/2$ |
| 5 | 2 | $x^{(0)}(i) = d^{(0)}(2i) x^{(1)}(i) = d^{(0)}(2i+1) x^{(2)}(i) = d^{(1)}(3i) x^{(3)}(i) = d^{(1)}(3i+1) x^{(4)}(i) = d^{(1)}(3i+2)$ | $M^{layer}_{symb} = M^{(0)}_{symb}/2 = M^{(1)}_{symb}/3$ |
| 6 | 2 | $x^{(0)}(i) = d^{(0)}(3i) x^{(1)}(i) = d^{(0)}(3i+1) x^{(2)}(i) = d^{(0)}(3i+2) x^{(3)}(i) = d^{(1)}(3i) x^{(4)}(i) = d^{(1)}(3i+1) x^{(5)}(i) = d^{(1)}(3i+2)$ | $M^{layer}_{symb} = M^{(0)}_{symb}/3 = M^{(1)}_{symb}/3$ |
| 7 | 2 | $x^{(0)}(i) = d^{(0)}(3i) x^{(1)}(i) = d^{(0)}(3i+1) x^{(2)}(i) = d(0)(3i+2) x^{(3)}(i) = d^{(1)}(4i) x^{(4)}(i) = d^{(1)}(4i+1) x^{(5)}$ | $M^{layer}_{symb} = M^{(0)}_{symb}/3 = M^{(1)}_{symb}/4$ |

TABLE 1-continued

| Number of layers | | Codeword-to-layer mapping i = 0, 1, ..., $M^{layer}_{symb} - 1$ | |
|---|---|---|---|
| 8 | 2 | $x^{(0)}(i) = d^{(0)}(4i)x^{(1)}(i) =$ $d^{(0)}(4i+1)x^{(2)}(i) = d^{(0)}$ $(4i+2)x^{(3)}(i) = d^{(0)}(4i+3)x^{(4)}(i) = d^{(1)}(4i)x^{(5)}$ $(i) = d^{(1)}(4i+1)x^{(6)}(i) =$ $d^{(1)}(4i+2)x^{(7)}(i) = d^{(1)}$ $(4i+3)$ | $M^{layer}_{symb} = M^{(0)}_{symb}/4 = M^{(1)}_{symb}/4$ |

TABLE 2

| Number of layers | Number of codewords | Codeword-to-layer mapping i = 0, 1, ..., $M^{layer}_{symb} - 1$ | |
|---|---|---|---|
| 2 | 1 | $x^{(0)}(i) = d^{(0)}(2i)x^{(1)}(i) =$ $d^{(0)}(2i+1)$ | $M^{layer}_{symb} = M^{(0)}_{symb}/2$ |
| 4 | 1 | $x^{(0)}(i) = d^{(0)}(4i)x^{(1)}(i) =$ $d^{(0)}(4i+1)x^{(2)}(i) = d^{(0)}$ $(4i+2)x^{(3)}(i) = d^{(0)}$ $(4i+3)$ | $M^{layer}_{symb} = M^{(0)}_{symb}/4$ if $M^{(0)}_{symb} \mod 4 = 0 M^{layer}_{symb} =$ $(M^{(0)}_{symb} + 2)/4$ if $M^{(0)}_{symb} \mod 4 \neq 0$ If $M^{(0)}_{symb} \mod 4 \neq 0$, two null symbols shall be appended to $d^{(0)}(M^{(0)}_{symb} - 1)$ |

In Tables 1 and 2, $x^{(a)}(i)$ denotes i-th symbol of layer a, and $d^{(n)}(i)$ denotes i-th symbol of a codeword n. $M^{layer}_{symb}$ denotes the number of complex-valued modulation symbols mapped to a layer, and $M^{(n)}_{symb}$ denotes the number of complex-valued modulation symbols in a codeword n.

The complex-valued modulation symbols on each layer can be precoded by the precoder 304 for transmission on the antenna ports. A layer is also referred as a MIMO stream. In other words, the precoder 304 maps the complex-valued modulation symbols to the antenna ports. Specifically, the precoder 304 multiplies the output x of the layer mappers 303 by an $N_t \times M_t$ precoding matrix W. The output of the precoder 304 may be represented as an $N_t \times N_F$ matrix z.

The complex-valued modulation symbols for each antenna port are mapped/allocated to resource elements by the resource element mappers 305. The resource element mappers 305 can allocate the complex-valued modulation symbols for each antenna port to appropriate subcarriers and multiplex them according to users.

The OFDM/SC-FDM signal generators 306 generate complex-valued time domain Orthogonal Frequency Division Multiplexing (OFDM) signal or Single Carrier Frequency Division Multiplexing (SC-FDM) signal. In more detail, the OFDM/SC-FDM signal generators 306 output OFDM/SC-FDM symbols by modulating the complex-valued modulation symbols for each antenna port according to OFDM modulation scheme. For example, the OFDM/SC-FDM signal generators 306 may perform Inverse Fast Fourier Transform (IFFT) for the antenna-specific symbols and insert a Cyclic Prefix (CP) into the resulting IFFT time-domain symbol. The OFDM/SC-FDM symbol is transmitted to the receiving apparatus through the antenna ports.

If the transmitters 100a and 100b adopt SC-FDM Access (SC-FDMA) scheme for transmitting a codeword, each of the transmitters 100a and 100b includes fast Fourier transformer (not shown) and the fast Fourier transformer performs FFT to the complex-valued modulation symbols for each antenna and output the fast Fourier transformed symbols to the resource elements mappers 305.

The receivers 300a and 300b decode and demodulate radio signals received through the antennas 500a and 500b from the outside and transfer the demodulated signals to the processors 400a and 400b. The antenna 500a or 500b connected to each of the receivers 300a and 300b may include N reception antennas. Signals received through the respective reception antennas are downconverted to baseband signals and recovered to an original data stream intended by the transmitter 100a or 100b, after multiplexing and channel demodulation. Therefore, each of the receivers 300a and 300b may have a signal recoverer for downconverting received signals to baseband signals, a multiplexer for multiplexing the baseband signals, and a channel de-modulator for demodulating the multiplexed signal layers to a corresponding codeword. The channel demodulator can map the received layer(s) to a corresponding codeword according to Table 1 or Table 2.

The signal recoverer, the multiplexer, and the channel demodulator may be configured as separate modules or incorporated into a single module.

Although it has been described in FIG. 1 and FIG. 2 that each of the transmitters 100a and 100b includes the scrambler 301, the modulation mappers 302, the layer mapper 303, the precoder 304, the resource element mappers 305 and the OFDMA/SC-FDM signal generators 306, the processors 400a and 400b of the transmitting apparatus may include the scrambler 301, the modulation mappers 302, the layer mapper 303, the precoder 304, the resource element mappers 305 and the OFDMA/SC-FDM signal generators 306. Likewise, although it has been described in FIG. 1 and FIG. 2 that each of the receivers 300a and 300b includes the signal recoverer, the multiplexer, and the channel demodulator, the processors 400a and 400b of the receiving apparatus may include the signal recoverer, the multiplexer, and the channel demodulator. Hereinafter, for convenience of description, the scrambler 301, the modulation mappers 302, the layer mapper 303, the precoder 304, the resource element mappers 305 and the OFDMA/SC-FDM signal generators 306 are included in the transmitters 100a and 100b separated from the processors 400a and 400b that control the operations of the scrambler 301, the modulation mappers 302, the layer mapper 303, the precoder 304, the resource element mappers 305 and the OFDMA/SC-FDM signal generators 306. And, the signal recoverer, the multiplexer, and the channel demodulator are included in the receivers 300a and 300b separated from the processors 400a and 400b that control the operations of the signal recoverer, the multiplexer, and the channel demodulator. However, the embodiments of the present invention can equally be applied to the case where the scrambler 301, the modulation mappers 302, the layer mapper 303, the precoder 304, the resource element mappers 305 and the OFDMA/SC-FDM signal generators 306 are included in the processors 400a and 400b and the case where the signal recoverer, the multiplexer, and the channel demodulator are included in the processors 400a and 400b.

The memories 200a and 200b may store programs required for signal processing and controlling of the processors 400a and 400b and temporarily store input and output information. Each of the memories 200a and 200b may be implemented into a flash memory-type storage medium, a hard disc-type storage medium, a multimedia card micro-type storage medium, a card-type memory (e.g. a Secure Digital (SD) or eXtreme Digital (XS) memory), a Random Access Memory (RAM), a Read-Only Memory (ROM), an Electrically Erasable Programmable Read-Only Memory (EEPROM), a Programmable Read-Only Memory (PROM), a magnetic memory, a magnetic disc, or an optical disk.

The processor 400b in a BS of the present invention can generate a PDCCH for transmitting a codeword. In the mean time, the processor 400b in the BS of the present invention allocate transmit power per resource element in accordance with the embodiments of the present invention, which will be described later, and controls the transmitter 100b to transmit data/control signal and/or reference signal in each OFDM symbol in accordance with the embodiments of the present invention. The processor 400b or the transmitter 100b in the BS can include a power allocating/setting module and the power allocating/setting module can allocate/set downlink transmit power in accordance with the embodiments of the present invention.

Also, the processor 400a in the UE of the present invention can be configured to calculate/measure/estimate downlink transmit power or downlink transmission power ratio between a data signal and a reference signal. Or the receiver 300a in the UE of the present invention can include a power setting module for calculating/measuring/estimating the downlink transmit power or the downlink transmission power ratio in accordance with the embodiments of the present invention.

Figure 3:
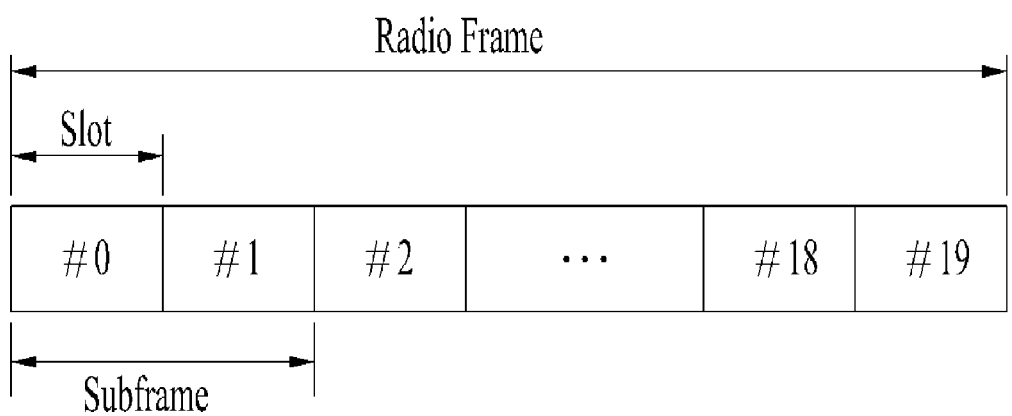
FIG. 3 illustrates an example of a structure of a radio frame used in the wireless communication system.

FIG. 3 illustrates an example of a structure of a radio frame used in the wireless communication system. Especially, FIG. 3 illustrates a structure of a radio frame of the 3GPP LTE/LTE-A system. The radio frame structure can be applied to a frequency division duplex (FDD) mode, a half frequency division duplex (H-FDD) mode, and a time division duplex (TDD) mode.

Referring to FIG. 3, the radio frame includes 10 subframes. A subframe includes two slots in time domain. A time for transmitting one subframe is defined as a transmission time interval (TTI). For example, one subframe may have a length of 1 millisecond (ms), and one slot may have a length of 0.5 ms.

Figure 4:
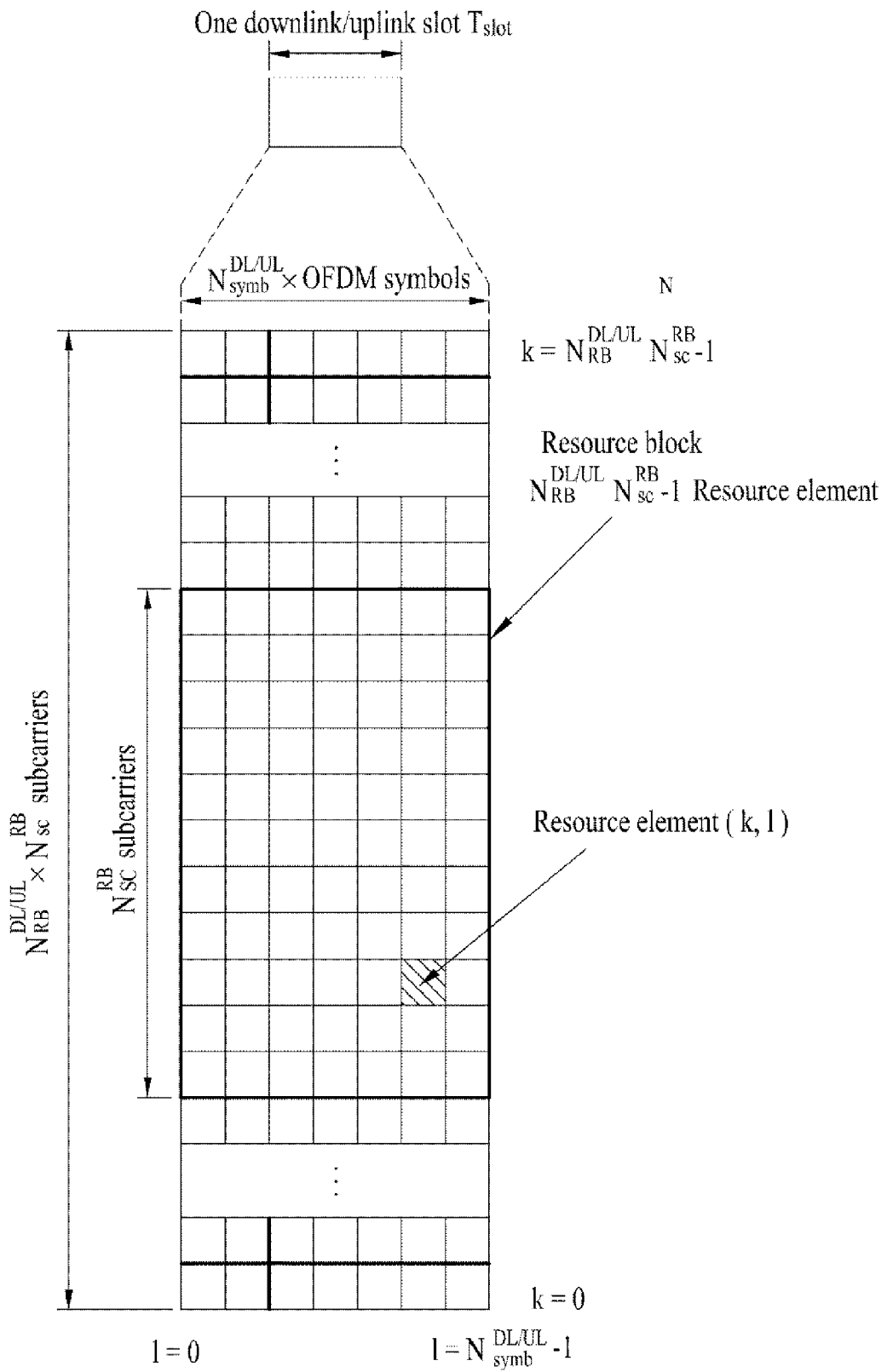
FIG. 4 illustrates an example of a structure of a downlink/uplink slot in the wireless communication system.

FIG. 4 illustrates an example of a structure of a downlink/uplink slot in the wireless communication system. Especially, FIG. 4 illustrates a structure of a resource grid of the 3GPP LTE/LTE-A system.

Referring to FIG. 4, one downlink/uplink slot includes a plurality of orthogonal frequency division multiplexing (OFDM) symbols in time domain, and includes a plurality of subcarriers in frequency domain. The OFDM symbol also represents one symbol period. The OFDM symbols may be referred to as OFDMA symbols or SC-FDMA symbols depending on a multiplexing access mode. The number of OFDMA symbols included in one slot can be varied depending on channel bandwidth and cyclic prefix (CP) length. A type of a slot or a subframe can be defined depending on the number of OFDM symbols included in the slot. For example, one slot includes seven OFDM symbols for a normal CP, and includes six symbols for an extended CP. One radio frame may include one type of slots or different types of slots. For convenience of description, a slot including seven OFDM symbols is mainly described in the embodiments of the present invention. However, the embodiments of the present invention, which will be described later, can be applied to other types of slots in the same manner.

In frequency domain, the OFDM symbol includes a plurality of subcarriers, and the number of subcarriers is determined depending on the size of FFT or IFFT. In frequency domain, resources can be grouped in a predetermined number of contiguous subcarriers in one slot. A group comprised of a predetermined number of subcarriers in one slot is referred to as a resource block (RB). One slot includes a plurality of RBs in frequency domain. The RB is a basic unit for resource allocation. The number of subcarriers within one RB may be 12, for example. In this case, the RB includes 7 OFDM symbols×12 subcarriers. A resource defined one symbol and one subcarrier is referred to as a resource element (RE). If a RB includes 7 OFDM symbols ×12 subcarriers, it means that the RB includes 84 REs.

Referring to FIG. 4, a transmission signal in each slot can be described by one or several grids of $N^{DL/UL}_{RB} N^{RB}_{sc}$ subcarriers and $ND^{DL/UL}_{symb}$ OFDM/SC-FDM symbols. There may be one resource grid per antenna port. The number of RBs, $N^{DL/UL}_{RB}$, included in one downlink/uplink slot depends on a downlink/uplink transmission bandwidth.

Each RE is uniquely defined by the index pair (k,l) in a slot where k=0, . . . , $N^{DL/UL}_{RB} N^{RB}_{SC}-1$ and l=k=0, . . . , $N^{DL/UL}_{symb}-1$ are the indices in the frequency and time domains, respectively. The REs can be classified into data RE for data transmission, reference signal RE for reference signal transmission and control RE for control information transmission.

Figure 5:
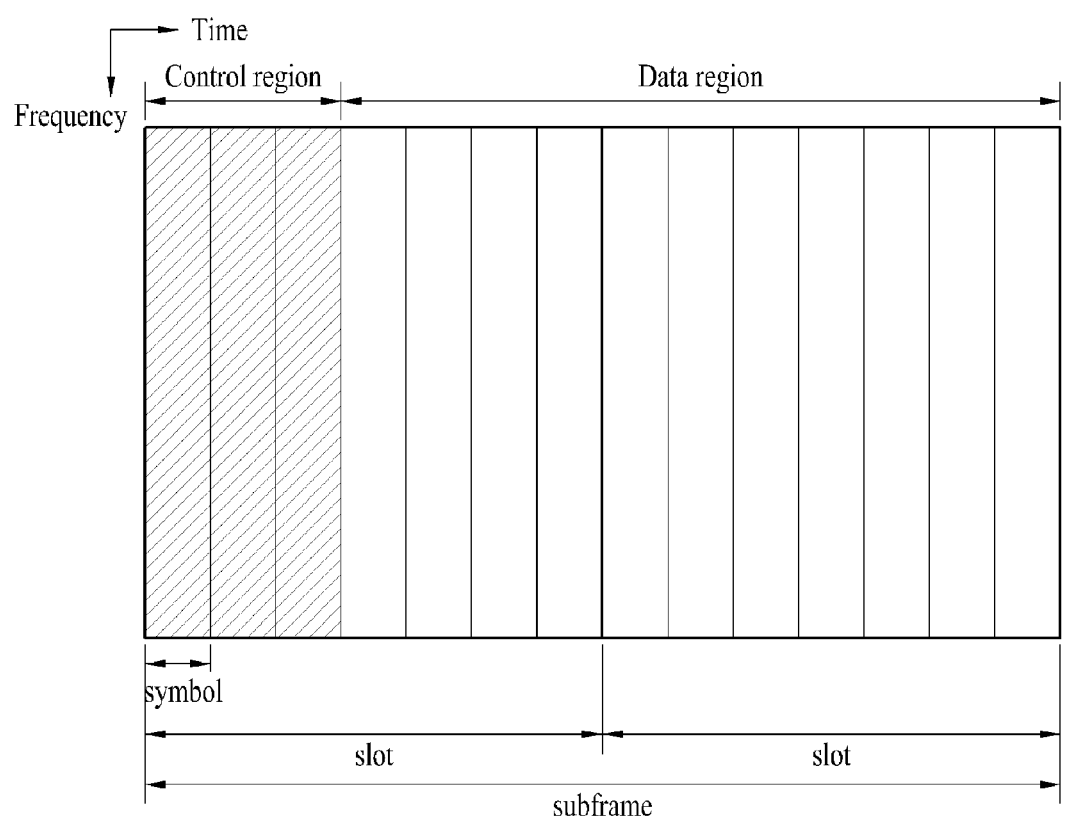
FIG. 5 illustrates an example of a structure of a downlink subframe in the wireless communication system.

FIG. 5 illustrates an example of a structure of a downlink subframe in the wireless communication system.

Referring to FIG. 5, a maximum of three OFDM symbols located in a front portion of the first slot within a subframe correspond to a control region to be assigned with a control channel. The remaining OFDM symbols correspond to a data region to be assigned with a physical downlink shared channel (PDSCH). For example, a physical control format indicator channel (PCFICH), a physical downlink control channel (PDCCH), a physical hybrid ARQ indicator channel (PHICH), etc can be allocated to the control region.

The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/not-acknowledgment (NACK) signal. Control information transmitted through the PDCCH is referred to as downlink control information (DCI). The DCI includes uplink or downlink scheduling information or includes an uplink transmit (Tx) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of Tx power control commands on individual UEs within an arbitrary UE group, a Tx power control command, activation of a voice over IP (VoIP), etc. A plurality of PDCCHs can be transmitted within a control region. The PDCCH may be transmitted per PDSCH in a corresponding data region. The UE can monitor the plurality of PDCCHs. The PDCCH can be used differently according to DCI format, usage and coding rate.

The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined according to a correlation between the number of CCEs and the coding rate provided by the CCEs. The BS determines a PDCCH format according to a DCI to be transmitted to the UE, and attaches a cyclic redundancy check (CRC) to control information.

The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (P-RNTI)) may be masked to the CRC. If the PDCCH is for system information (more specifically, a system information block (SIB) to be described below), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

The PDSCH is transmitted on the data region. One to four layers are used for a PDSCH transmission.

Figure 6:
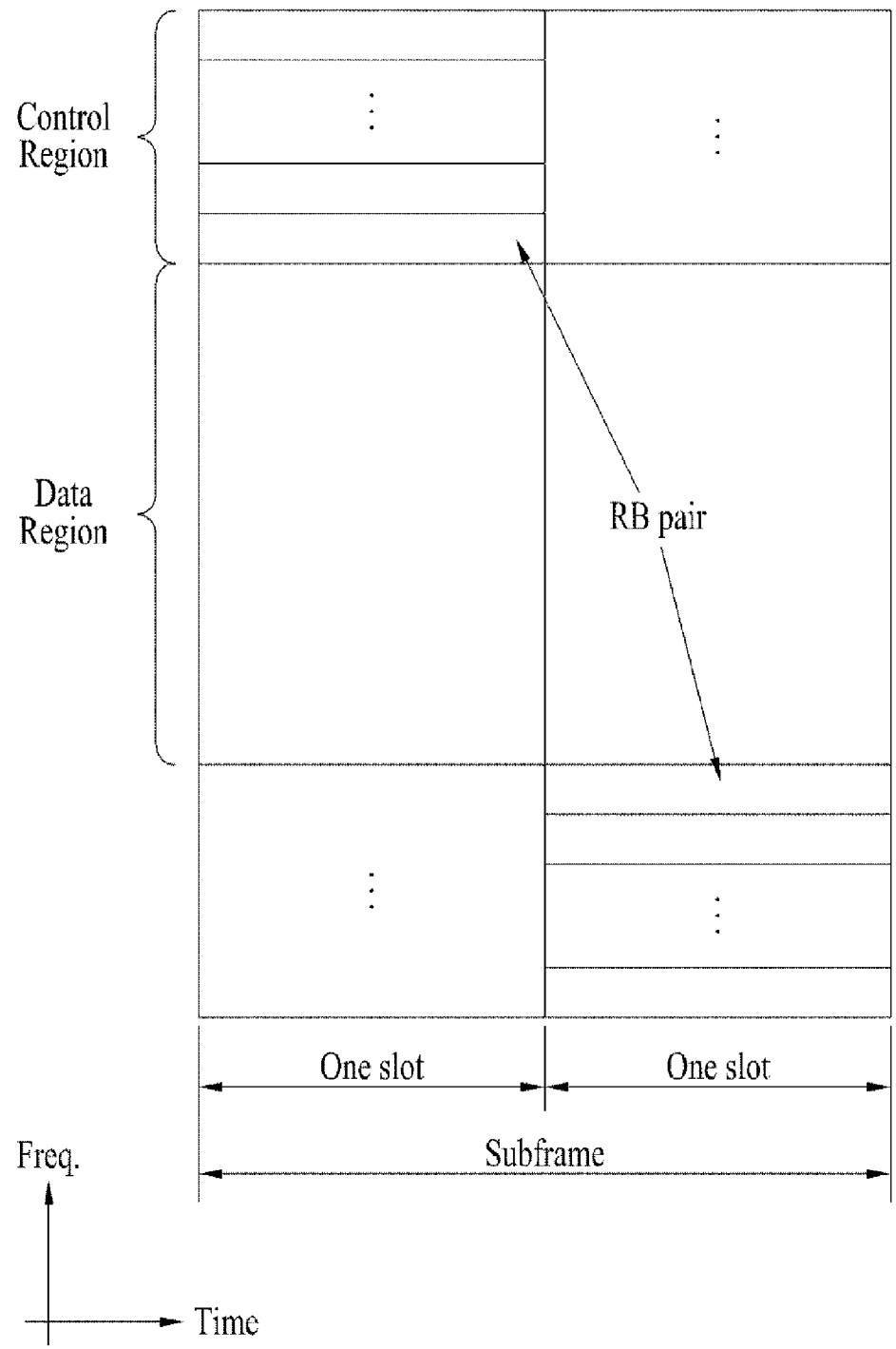
FIG. 6 illustrates an example of a structure of an uplink subframe in the wireless communication system.

FIG. 6 illustrates an example of a structure of an uplink subframe in the wireless communication system.

Referring to FIG. 6, an uplink subframe can be divided in a frequency domain into a control region and a data region. One or several physical uplink control channels (PUCCHs) can be allocated to the control region for carrying uplink control information (UCI). One or several physical uplink shared channels (PUSCHs) can be allocated to the data region for carrying user data. If a UE adopts SC-FDMA scheme for uplink transmission, the UE may not simultaneously transmit the PUCCH and the PUSCH for maintaining a single carrier property. The PUCCH for one UE is allocated to an RB pair in a subframe. RBs belonging to the RB pair occupy different subcarriers in respective two slots. This is called that the RB pair allocated to the PUCCH is frequency-hopped in a slot boundary.

In the mean time, various reference signals are transmitted between a BS and a UE for mitigating signal interference, estimating channel state between the BS and the UE, demodulating signal transmitted between the BS and the UE, and the like. A reference signal means a special waveform signal transmitted from a BS to a UE or from the BS to the BS.

The reference signals associated with the present invention will be described with reference to FIGS. 7 to 14.

The reference signals can be classified to dedicated reference signal (DRS) and common reference signal (CRS). For the DRS and CRS, different terminologies can be used such as demodulation RS (DMRS) and cell-specific reference signal, respectively. The DMRS is also referred to as a user equipment specific (UE-specific) RS.

Figure 7:
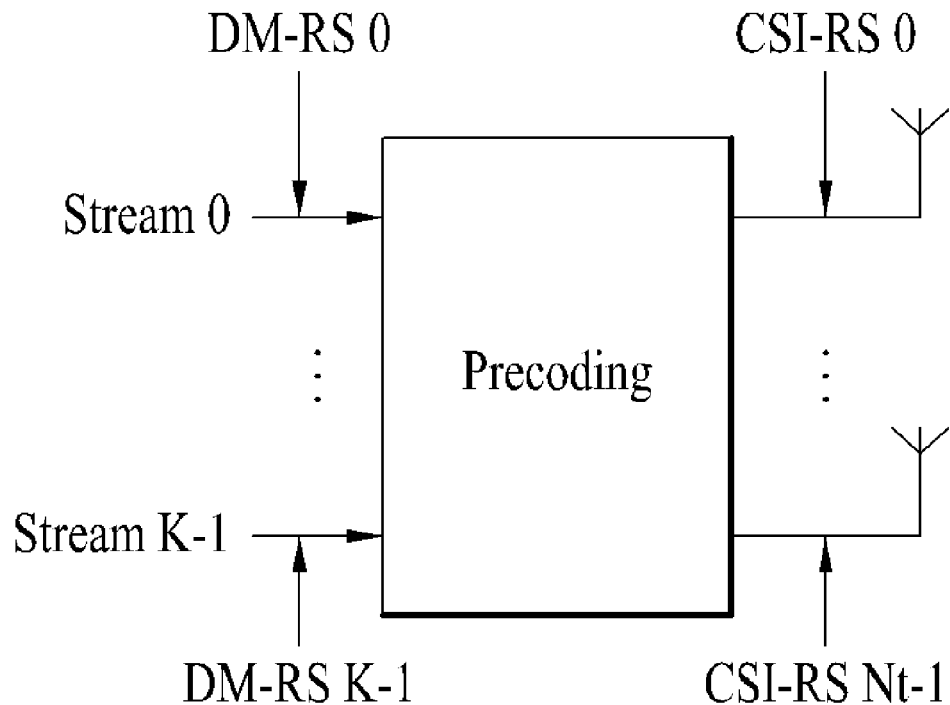
FIG. 7 is a conceptual diagram of a DRS transmission. Especially.

FIG. 7 is a conceptual diagram of a DRS transmission. Especially, FIG. 7 illustrates a transmitter transmitting a precoded RS.

The DRS is only used for a specific UE and the other UE cannot use this RS. The DRS is normally used for demodulation purpose and it can be classified to a precoded RS and a non-precoded RS. For example, a UE can arrange a received data signal to a position on a signal constellation in a predetermined modulation scheme based on DRSs transmitted with the data signal.

Referring to FIG. 7, if the precoded RS is employed as a DRS, the RS is also precoded with a precoding matrix which is used for data symbol and the same number of RS sequences corresponding to a number of layers K is transmitted. Here, K is equal to or smaller than the number of antenna ports N. The K layers can be allocated to either one UE or multiple UEs. If multiple UEs share the K layers, 1 to K UEs share the same time/frequency resources at the same time.

Figure 8:
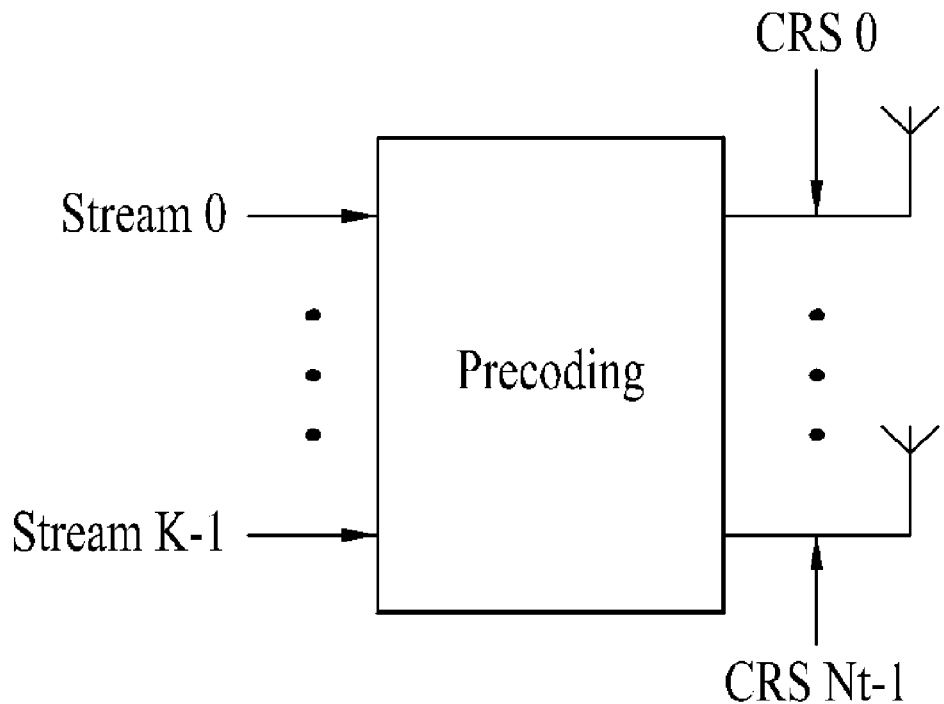
FIG. 8 is a conceptual diagram of a CRS transmission.

FIG. 8 is a conceptual diagram of a CRS transmission.

The CRS can be used for both demodulation and measurement purpose and it is shared by all UEs in a cell. In this case, the RS should not be encoded with precoder at a transmitter as shown in FIG. 8 since the precoder normally is used for a specific UE. However, if there is a cell-specific precoder in a specific system, it is not regarded as a precoder but virtualization. In this case, although the CRS is precoded at the transmitter, the RS is not regarded as a precoded CRS. CRS sequences should be transmitted for all antenna ports irrespective of the number of layers.

Figure 9:
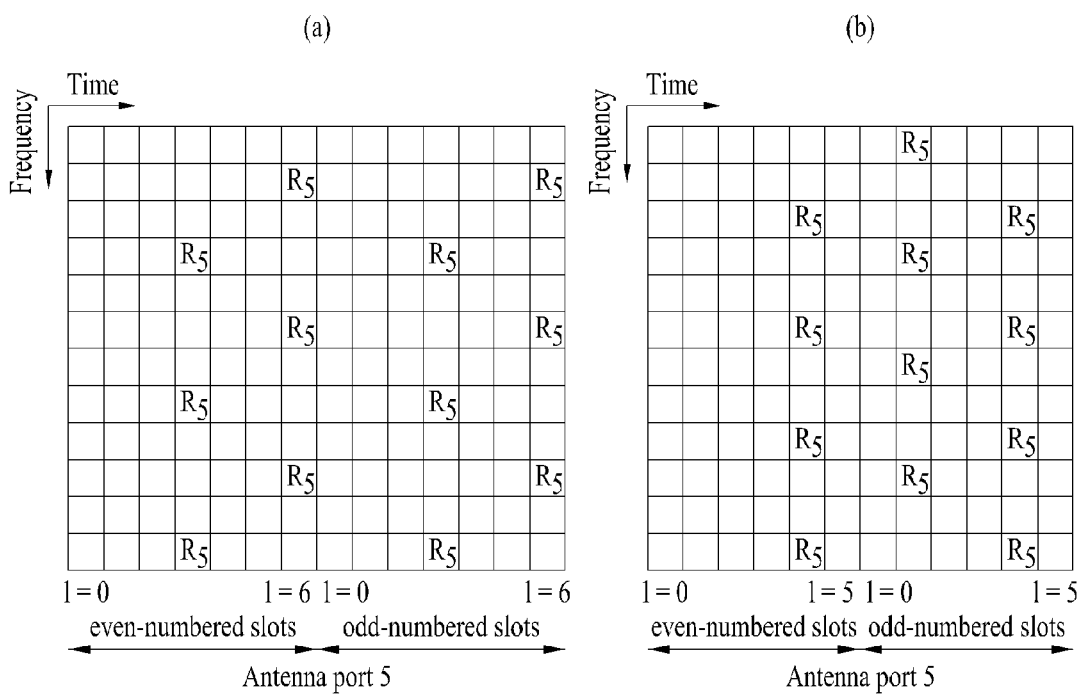
FIG. 9 illustrates examples of DRS patterns being used in LTE system.

FIG. 9 illustrates examples of DRS patterns being used in LTE system. Especially, FIG. 9(a) illustrates a DRS pattern in a normal CP subframe, and FIG. 9(b) illustrates an example of DRS pattern in an extended CP subframe. In FIG. 9, '1' denotes OFDM symbol position in a slot.

In the mean time, the LTE system only supports a maximum of one layer and the layer should be transmitted with CRS at the same time. Therefore, if DRS(s) are transmitted with CRS, RS overhead would be seriously high as compared with that of CRS only transmission.

FIG. 10 illustrates examples of CRS patterns according to antenna ports.

CRSs are transmitted in all downlink subframes in a cell supporting PDSCH transmission. Referring to FIG. 10, the CRS patterns for each antenna ports are mutually orthogonal in time/frequency domain.

If a transmitter has one antenna port then the antenna port transmits the CRS pattern for antenna port 0. If 4Tx MIMO transmission is employed in LTE downlink, the CRSs for antenna port 0~3 are used at the same time. To minimize interference between RS signals, when a certain antenna port transmits its CRS, the certain antenna port does not transmits a signal at the REs in which CRSs for the other antenna ports are transmitted.

In the meantime, a predefined sequence (e.g., Pseudo-random (PN), m-sequence and etc.) can be multiplied with an RS so as to minimize inter-cell interference, thus increasing channel estimation performance. The PN sequence is applied in OFDM symbol level in a subframe and the sequence can be defined according to the cell-ID, the subframe number and the position of OFDM symbol. For example, referring to FIG. 10, the number of CRS for an antenna port is two in an OFDM symbol having RS in an RB and the number of RBs in LTE system can be from 6 to 110. Therefore, the total number of CRSs for an antenna port in an OFDM symbol having RS(s) can be $2 \times N_{RB}$. This implies that the sequence length should be $2 \times N_{RB}$. Here, $N_{RB}$ denotes number of RBs corresponding to a (downlink) bandwidth and the sequence can be binary or complex.

The CRS sequence may be defined by

Math Figure 1

$$r_{l,n_s}(m) = \frac{1}{\sqrt{2}}(1 - 2 \cdot c(2m)) + j\frac{1}{\sqrt{2}}(1 - 2 \cdot c(2m+1)) \quad \text{[Math. 1]}$$

where $m = 0, 1, \ldots, N_{RB}^{max,DL} - 1$, where $n_s$ is the slot number within a radio frame and l is the OFDM symbol number within the slot and $N^{max,DL}_{RB}$ denotes the number of RBs corresponding to the maximum downlink bandwidth in LTE system. Thus $N^{max,DL}_{RB}$ could be 110 as mentioned above.

The DRS sequence may be defined by

Math Figure 2

$$r_{n_s}(m) = \frac{1}{\sqrt{2}}(1 - 2 \cdot c(2m)) + j\frac{1}{\sqrt{2}}(1 - 2 \cdot c(2m+1)) \quad \text{[Math. 2]}$$

where $m = 0, 1, \ldots, N_{RB}^{PDSCH} - 1$, where $N^{PDSCH}_{RB}$ denotes the bandwidth in resource blocks of the corresponding PDSCH transmission.

The pseudo-random (PN) sequence c(n) in Math Figures 1, 2 and 5 may can be defined by a length-31 Gold sequence as follows. The output sequence c(n) of length $M_{PN}$ where n=0, 1, ..., M, may be defined by MathFigure 3

$$c(n)=(x_1(n+N_c)+x_2(n+N_c))\mod 2$$

$$x_1(n+31)=(x_1(n+3)+x_1(n))\mod 2$$

$$x_2(n+31)=(x_2(n+3)+x_2(n+2)+x_2(n+1)+x_2(n))\mod 2 \quad \text{[Math.3]},$$

where $N_c$=1600 and the first m-sequence shall be initialized with $x_1(0)=1$, $x_1(n)=0$, n=1,2, ..., 30. The initialization of the second m-sequence may be denoted by MathFigure 4

$$c_{init}=\sum_{i=0}^{30}x_2(i)\cdot 2^i \quad \text{[Math.4]}$$

with the value depending on the application of the sequence.

In the mean time, to reduce the overall RS overhead, a DRS-based downlink transmission is used in LTE-A system. Since the CRS-based downlink transmission always need to transmit the CRSs for all physical antenna ports, the DRS-based downlink transmission may reduce the RS overhead considering the fact that only virtual antenna port needs RS.

Accordingly, in LTE-A system, DRSs which can be also referred as UE-specific RSs are supported for transmission of PDSCH and are transmitted on antenna port(s) p=5, p=7, p=8 or p=7,8, ..., v+6, where v is the number of layers used for transmission of the PDSCH. Up to 8 layers may be transmitted with DRS through antenna port(s) p=7~14 to support for a PDSCH. The DRS for antenna port 5 in LTE-A system corresponds to the DRS of LTE system. The DRSs are transmitted only on the resource blocks upon which the corresponding PDSCH is mapped. For antenna port 5, DRS sequence may be defined by Math Figure 2. For any of the antenna ports p∈{7,8, ..., v+6}, the RS sequence may be defined by Math Figure 5

$$r(m) = \frac{1}{\sqrt{2}}(1 - 2 \cdot c(m)) + j\frac{1}{\sqrt{2}}(1 - 2 \cdot c(2m+1)) \quad \text{[Math. 5]}$$

where $m = 0, 1, \ldots, N_{RB}^{max,DL} - 1$

FIG. 11 illustrates an example of DRS patterns in an LTE-A system. Especially, FIG. 11 illustrates DRS patterns of LTE-A system in a physical resource block (PRB) for a regular subframe where the DRS patterns supports up to 4 layers.

Figure 12:
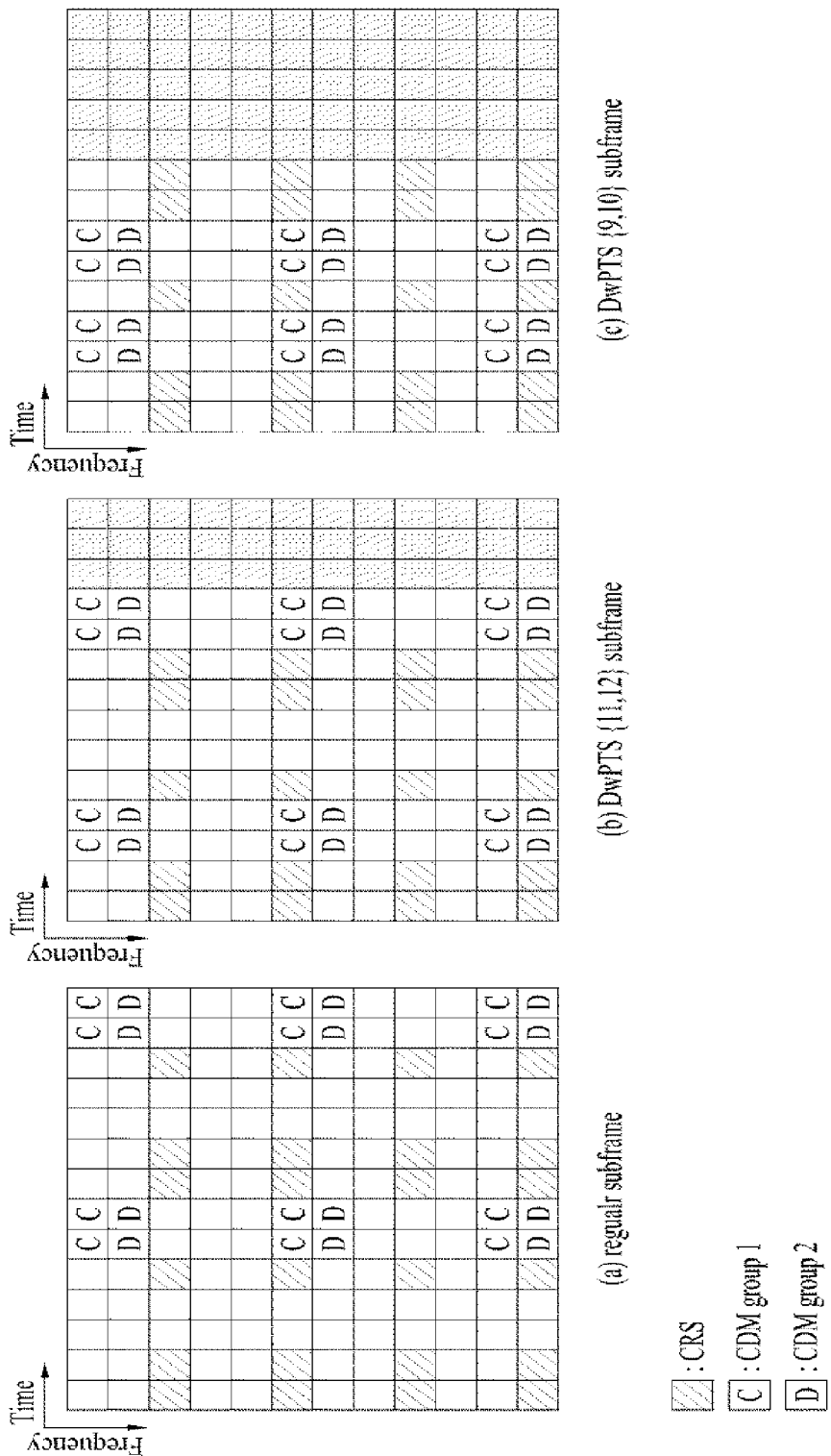
FIG. 12 illustrates examples of a regular subframe and special subframes in which DRSs of LTE-A system and CRSs of LTE system are transmitted.

FIG. 12 illustrates examples of a regular subframe and special subframes in which DRSs of LTE-A system and CRSs of LTE system are transmitted.

Special subframes include guard period (GP) in addition to seven OFDM symbols (for normal CP) or six OFDM symbols (for extended CP). The subframes excluding the GP can be referred to as regular subframes. Referring to FIG. 12, in LTE-A system, the CRS can be transmitted for the purpose of supporting LTE UEs.

FIG. 13 illustrates the resource elements used for DRSs for normal CP for antenna ports 7 to 10.

DRSs which antenna ports 7 and 8 transmit may belong to the CDM group 1 of FIGS. 11 and 12 and DRSs antenna ports 9 and 10 may belong to the CDM group 2 of FIGS. 11 and 12. Each of antenna ports 7 to 10 may transmit a corresponding DRS.

In the meantime, the DRS is only allowed to use for demodulation purpose so that another RS should be transmitted for channel state/quality measurement. Accordingly, an RS for feed baking channel state information to a BS should be transmitted as well as DRS so that a UE can estimate downlink channel state. To this end, the channel state information RS (CSI-RS) is used in LTE-A system.

FIG. 14 illustrates an example of CSI-RS transmission with a duty cycle.

In order to prevent the increase of RS overhead, the CSI-RS may be transmitted with a certain duty cycle. Referring to FIG. 14, a BS may transmit CSI-RS for antenna(s) of a cell belonging to the BS every 5 subframes. A UE located in the cell may receive the CSI-RSs transmitted via the cell and estimate/measure state/quality of the channel configured between the UE and the antennas of the cell. If the UE communicates with the cell only, the UE does not have to monitor every subframes for detecting the CSI-RS of the cell, but may monitor only every 5 subframes from the first subframe having the CSI-RS.

Figure 15:
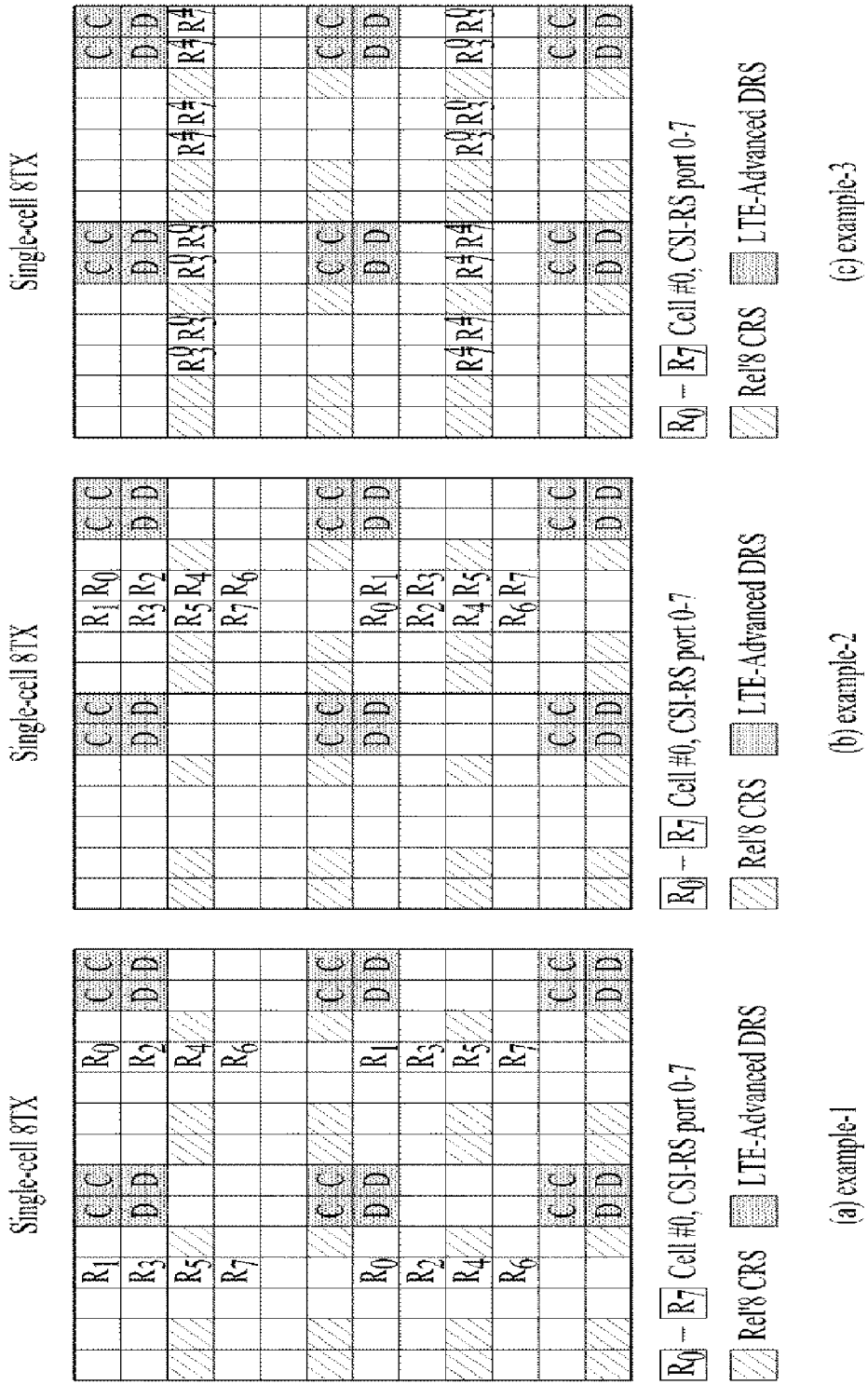
FIG. 15 illustrates examples of RS patterns available in an LTE-A system.

FIG. 15 illustrates examples of RS patterns available in an LTE-A system. Especially, FIG. 15 illustrates examples of CSI-RS patterns supporting 8 transmission antennas.

Referring to FIG. 15, the CSI-RS can be transmitted in PDSCH region. In a subframe in which the CSI-RS is transmitted, CRS(s) of LTE system may be transmitted for supporting LTE UEs and DRS(s) of LTE./LTE-A system may be transmitted for de-modulation.

CSI-RSs are transmitted on antenna port(s) p∈{15, ...,22}. In FIG. 15, CSI-RS ports 0 to 7 respectively correspond to antenna ports 15 to 22 in one cell or one BS.

In the mean time, code division multiplexing (CDM) technique can be used in multiplexing UE-specific RSs in order to simultaneously transmit a plurality of layers. In an LTE system, when a UE-specific RS is used, a maximum of 2 layers can be multiplexed on an OFDM symbol for one or two UEs by using one CDM group with 2×2 Walsh spreading. Referring to FIGS. 11, 12 and 15, a maximum of 4 layers can be multiplexed on an OFDM symbol for one to four UEs by using two CDM groups with 2×2 Walsh spreading or by using one CDM group with 4×4 Walsh spreading. For another example, a maximum of 8 layers can be multiplexed on an OFDM symbol for one to eight UEs by using four CDM groups with 2×2 Walsh spreading or by using two CDM groups with 4×4 Walsh spreading. It would be possible to multiplex more than 8 layers by using more than one CDM group with 4×4 Walsh spreading. If more than one layer is multiplexed into an OFDM symbol by using CDM technique, the power relation between a data RE and an RS RE should be properly defined since the number of layers per data RE and the number of layers per RS could be different within one OFDM symbol and a total transmit power available for each OFDM symbol is limited. The number of layers being transmitted simultaneously or the number of layers multiplexed in an OFDM symbol will be referred to as a transmission rank.

Figure 16:
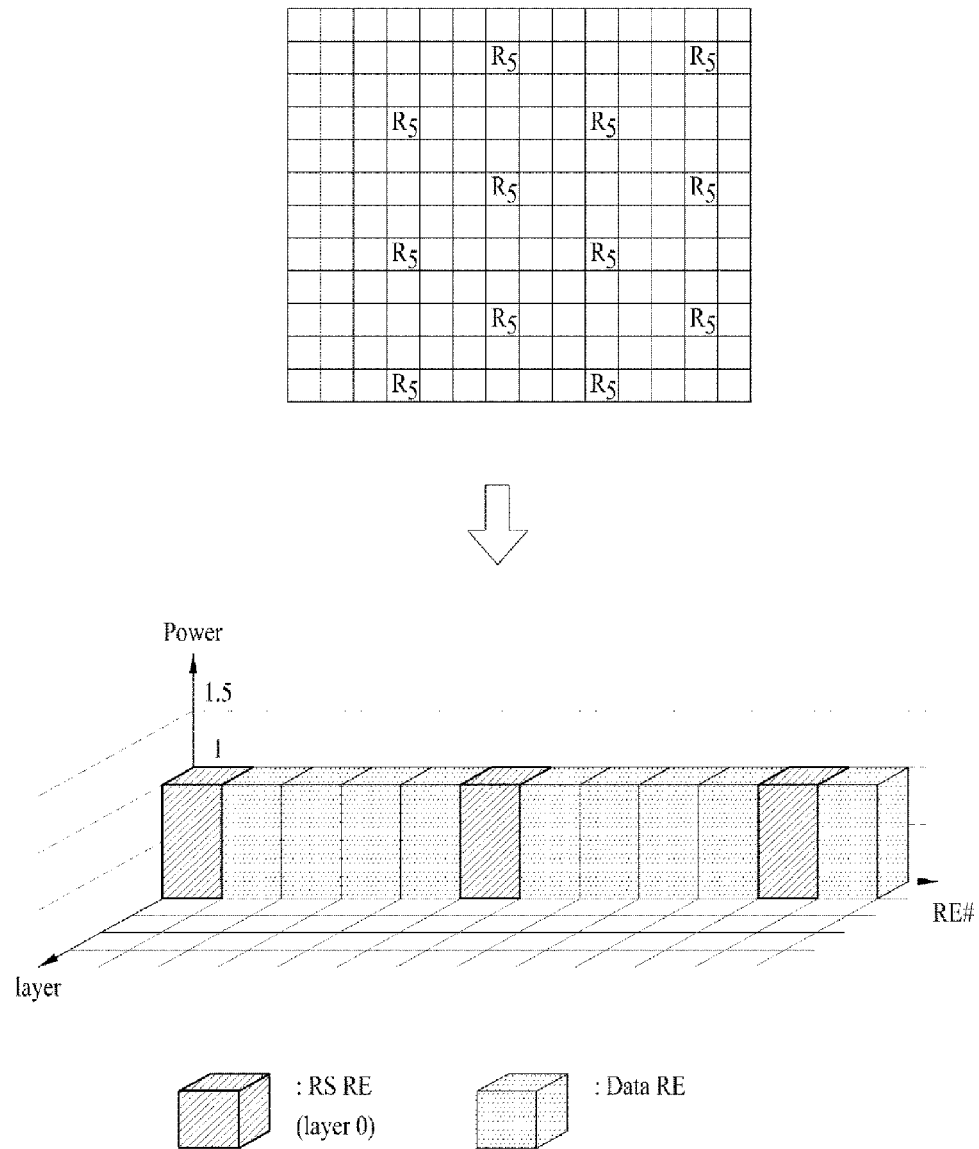
FIG. 16 illustrates an example of power allocation for UE-specific RS REs and data REs when the transmission rank is 1.

FIG. 16 illustrates an example of power allocation for UE-specific RS REs and data REs when the transmission rank is 1. Hereinafter, the UE-specific RS REs will be referred to as RS REs for convenience of description.

Referring to FIG. 16, when the transmission rank is 1, a BS can transmit UE-specific RSs for layer 0 through antenna port 5. The precoder used for data of the layer 0 is also used for a UE-specific RS, the power ratio between a data RE and an RS RE in the layer 0 is the same. Hence, information indicating the power ratio between a data RE and an RS RE in the layer 0 does not have to be transmitted to a UE because the ratio would have been predefined and shared between a BS and the UE. For example, the BS assigns the same power to a UE-specific RS RE and a non-RS RE within each OFDM symbol containing UE-specific RSs, the same power is assigned to each subcarrier in an OFDM symbol containing UE-specific RSs. Since UE-specific RSs are transmitted on a data region of each downlink subframe as shown in FIG. 5, the non-RS RE is a PDSCH RE, i.e., a data RE. Hereinafter, data power or data transmission power denotes power of a layer in a data RE and RS power or RS transmission power denotes power of a UE-specific RS in an RS RE. In other words, power per data RE for a layer or power per layer in a data RE will be referred to as data power, and power per UE-specific RS for a layer or power per layer in an RS RE will be referred to as RS power.

Referring to FIG. 16, the ratio of data power to UE-specific RS power is 1 over all the OFDM symbols containing UE-specific RSs. A UE may perform demodulation of the layer 0 with assuming that the ratio of data power to UE-specific RS is 0dB.

Hereinafter, it will be assumed that antenna ports 7 to 10 are used for transmitting layers 0 to 3, respectively.

Figure 17:
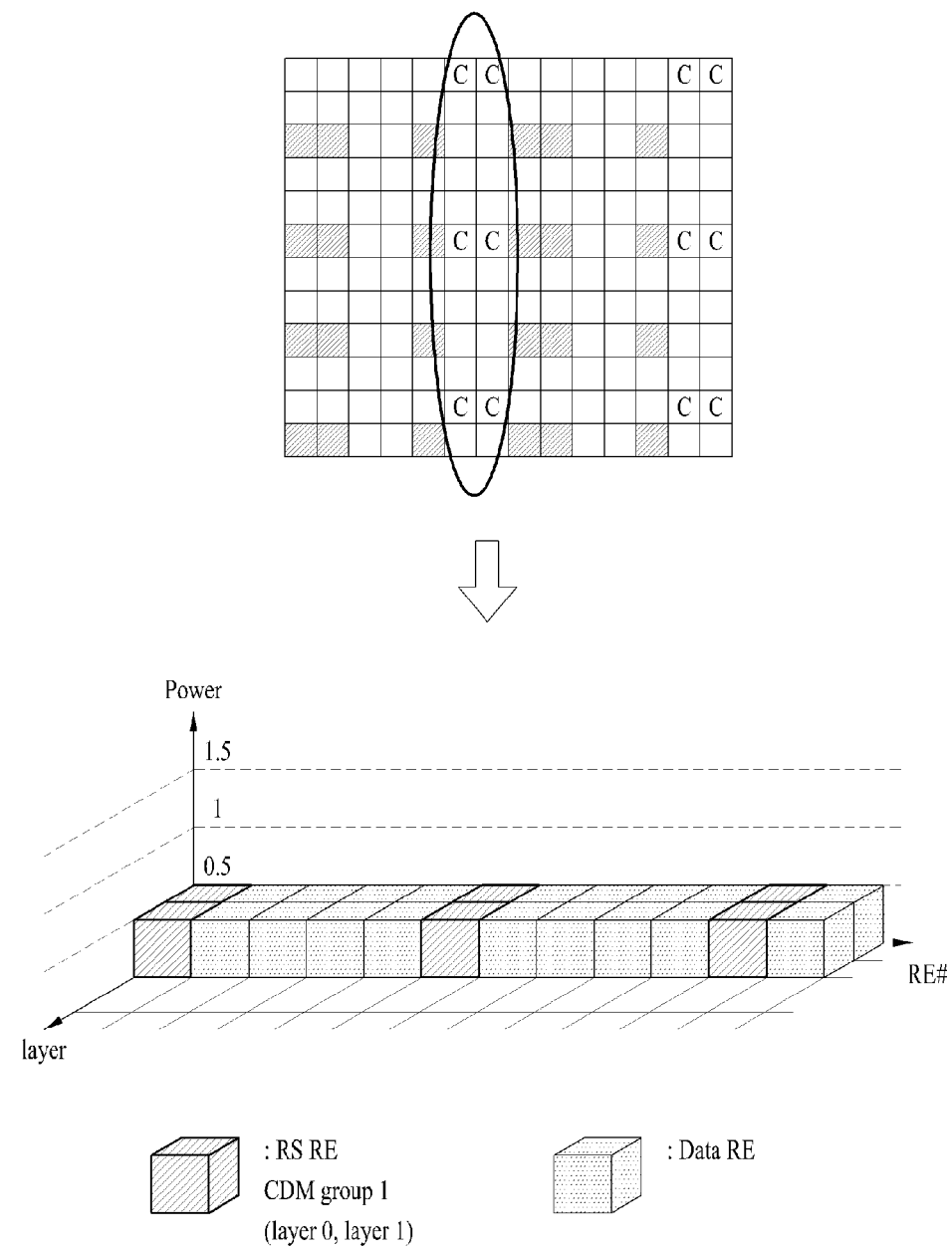
FIG. 17 illustrates an example of power allocation for UE-specific RS REs and data REs when the transmission rank is 2.

FIG. 17 illustrates an example of power allocation for UE-specific RS REs and data REs when the transmission rank is 2. For rank-2 transmission, one CDM group can be used for multiplexing 2 layers.

Referring to FIG. 17, when the transmission rank is 2, a BS can transmit UE-specific RSs for layers 0 and 1 through antenna ports 7 and 8, for example. The antenna ports 7 and 8 may transmit the UE-specific RSs, respectively, as shown in FIG. 13. In FIG. 7, two UE-specific RSs are multiplexed into an RS RE, and data of two layers is multiplexed into a data RE.

Since the precoder used for data of layers 0 and 1 is also used for UE-specific RSs for the layers 0 and 1, the power ratio between a data RE and an RS RE in each layer is the same, so information indicating the power ratio between data RE and an RS RE in each layer may not be transmitted. For example, for up to rank-2 transmission, the BS assigns power to an RS RE and a data RE within each OFDM symbol containing UE-specific RSs, so that the ratio of data power to RS power is 1 over all the OFDM symbols containing UE-specific RSs. A UE may perform demodulation of the layers 0 and 1 with assuming that the ratio of data power to UE-specific RS is 0dB.

Figure 18:
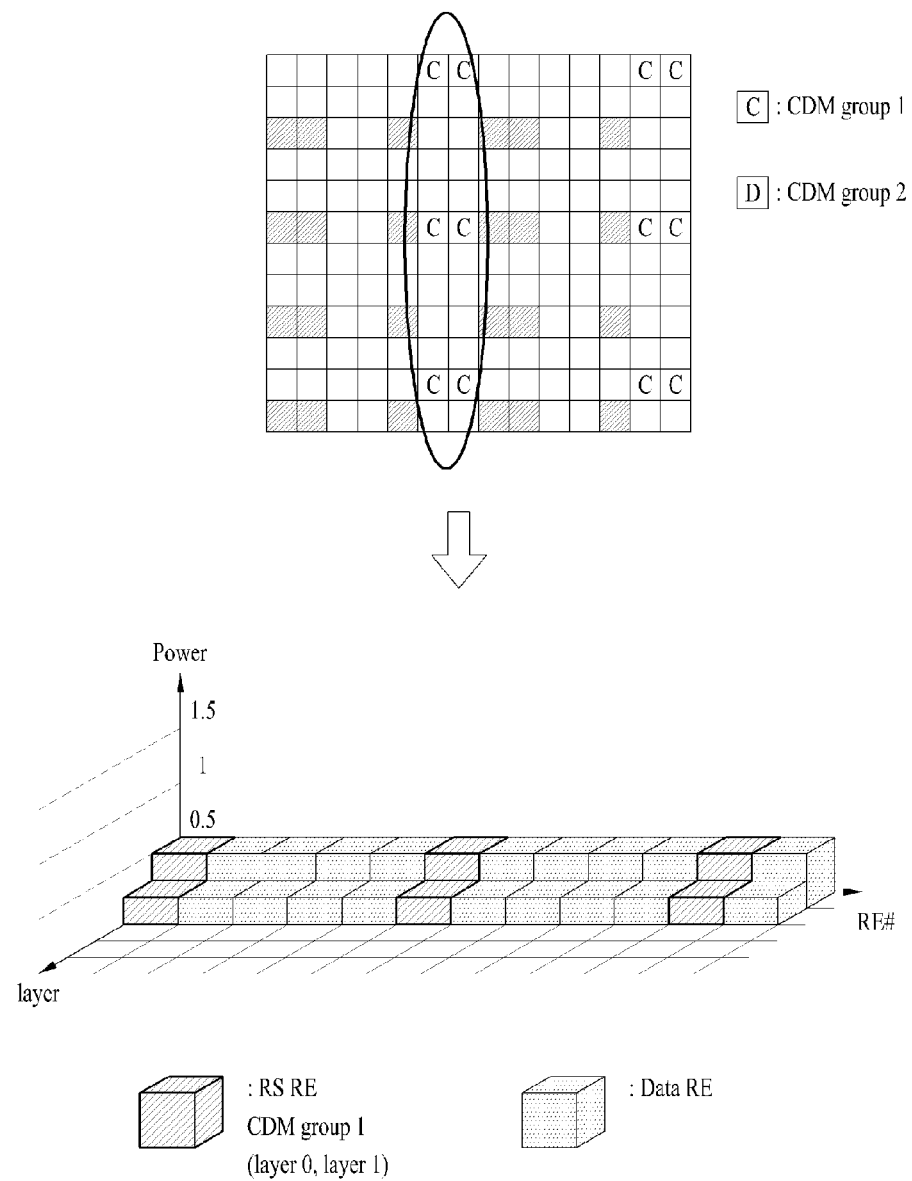
FIG. 18 illustrates another example of power allocation for UE-specific RS REs and data REs when the transmission rank is 2.

FIG. 18 illustrates another example of power allocation for UE-specific RS REs and data REs when the transmission rank is 2.

Referring to FIG. 18, the BS assigns power to an RS RE and a data RE within each OFDM symbol containing UE-specific RSs, so that the ratio of data power to UE-specific RS power is 1 over all the OFDM symbols containing UE-specific RSs. However, the BS can assign different power to the layer 0 and the layer 1 in an RS RE. Since the precoder used for data of layers 0 and 1 is also used for UE-specific RSs for the layers 0 and 1, the power ratio between a data RE and an RS RE in each layer is the same, so information indicating the power ratio does not have to be transmitted. If a ratio between power per data RE and power per RS RE is also the same within each OFDM symbol, a UE can easily recognize the power ratio between the layers without the information indicating power difference between the layers. It is because the information indicating the power ratio between layer 0 and the layer 1 is implicitly informed to a UE by a layer transmitted with the same power in a data RE and an RS RE.

As shown in FIG. 18, although the information indicating power difference of the layer 0 and the layer 1 is not informed to a UE, the power per RE in the layer 0 and the layer 1 can be different as far as the RS power is the same as the data power in each layer. It has been assumed that the total transmission power is the same in FIG. 17 and FIG. 18, although the power level in FIG. 18 is different across the layers. Hereinafter, for convenience of description, the power level in a data RE in the layer i will be referred to as $\alpha_i$ and the power level in an RS RE in the layer i will be referred to as $\beta_i$. Referring to FIGS. 17 and 18, $\alpha_0+\alpha_1=\gamma$ and $\alpha_i=\beta_i (i=0,1)$ should be satisfied, and $\gamma$ denotes a certain level of power. As shown in FIG. 18, $\alpha_0$ and $\alpha_1$ can be different.

As described with reference to FIGS. 17 and 18, a UE knows a ratio between data power and RS power if transmission rank is 1 or only one CDM group is used, since the same number of layers is multiplexed in the data RE and the RS RE. Every RE can have the same power level over OFDM symbols in a data region, and the power for a corresponding RE is shared by the multiplexed layers. If the transmission rank is equal to or less than 2 or only one CDM group is used for multiplexing, each layer has the same power level in a data RE and an RS RE as shown in FIGS. 17 and 18. However, if the transmission rank is higher than 2 or more than one CDM group is used for multiplexing, not all layers can have the same power level in a data RE and an RS RE since different number of layers can be multiplexed in the data RE and the RS RE.

Figure 19:
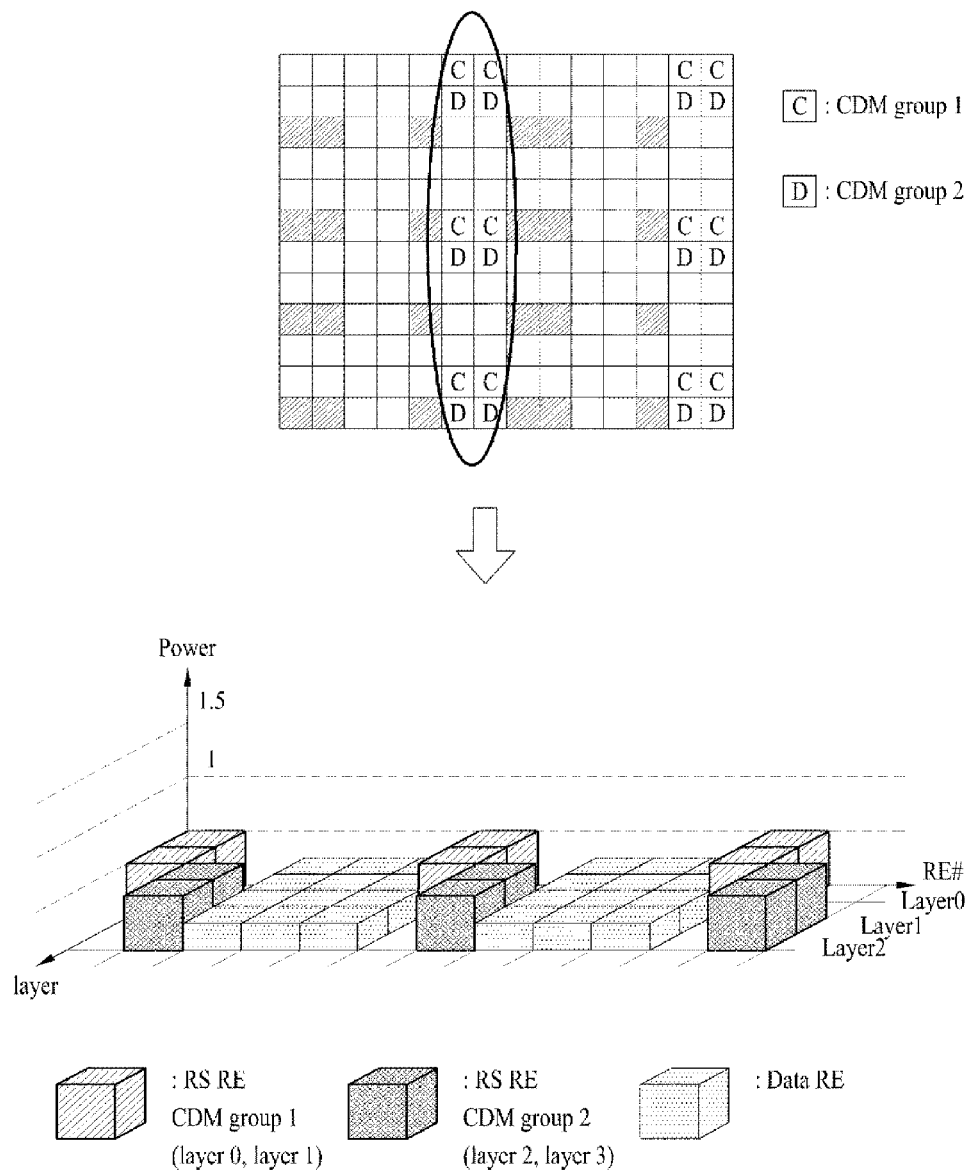
FIG. 19 illustrates an example of power allocation for UE-specific RS REs and data REs when the transmission rank is 4.

FIG. 19 illustrates an example of power allocation for UE-specific RS REs and data REs when the transmission rank is 4.

Referring to FIG. 19, the different number of layers is multiplexed in an data RE and an RS RE. Hence, it would be complicated to allocate the same power per layer in the data RE and the RS RE. Although the power of each layer is different across REs, the total transmission power in FIG. 19 can be $\alpha_0+\alpha_1+\alpha_2+\alpha_3=\gamma$, respectively. However, if $\alpha_i=\beta_i (i=0,1,2,3)$ is to be satisfied, full power transmission is not possible in condition that each RE has the same total transmission power $\gamma$.

RS Power Boosting with Offset Indication

It will be assumed that each data RE and RS RE has the same maximum power level γ and the maximum power γ is shared by layer(s) in the data RE or the RS RE. The following condition should be satisfied in each data RE.

Math Figure 6

$$\sum_{i=0}^{R-1} \alpha_i \leq \gamma \qquad \text{[Math. 6]}$$

In Math Figure 6, R denotes transmission rank. The following condition should be also satisfied in each CDM group.

Math Figure 7

$$\sum_{i=0}^{N_{R,k}-1} \beta_i \leq \gamma \qquad \text{[Math. 7]}$$

In Math Figure 7, $N_{R,k}$ denotes the number of layers in the CDM group k. Since the $N_{R,k}$ is always smaller than R if more than one CDM group is used for multiplexing, the number of layers multiplexed in an RS RE is less than that in a data RE. The power difference of each layer between the data RE and the RS RE can be represented by one of following Math Figures, for instance.

Math Figure 8

$$\text{offset}(k) = \frac{\gamma}{N_{R,k}} - \frac{\gamma}{R} \qquad \text{[Math. 8]}$$

Math Figure 9

$$\text{offset}(k) = \frac{\gamma}{R} - \frac{\gamma}{N_{R,k}} \qquad \text{[Math. 9]}$$

Math Figure 10

$$\text{offset}(k) = \frac{R}{N_{R,k}} \qquad \text{[Math. 10]}$$

Math Figure 11

$$\text{offset}(k) = \frac{N_{R,k}}{R} \qquad \text{[Math. 11]}$$

In Math Figures 8 to 11, $\gamma/N_{R,k}$ represents RS power for a corresponding layer in an RS RE and γ/R represents data power for the corresponding layer in a data RE. Referring to Math Figures 8 to 11, the RS power of a specific layer may be higher than data power of the specific layer. If the power ratio between a data RE and an RS RE for each layer is not constant, the offset(k) is informed for allowing a UE to demodulate higher modulation order such as 16 QAM and 64 QAM. It is because only when a UE knows the ratio between data power and RS power the UE can map bits received from a BS to symbols representing positions on a signal constellation. The offset (k) can be informed in various manners.

1. First Embodiment Quantized Level Indication

Several quantized offset levels could be tabulated and an index corresponding to an offset level can be informed to a UE. The index can be carried by PDCCH. For example, the offsets between RS power and data power for a certain layer can be quantized into {3, 1, 0, −1} (dB) or {−3, −1, 0, 1} (dB), for instance. Any one of the quantized offset levels {3, 1, 0, −1} (dB) or {−3, −1, 0, 1} (dB) can be informed to a UE with 2 bits. If the offset is informed to UE, the different power allocation across the layer is allowed.

According to this embodiment, although the full power transmission could not be achieved due to the quantization, a UE can mitigate the transmission power loss based on the offset level indication.

Memories 200a and 200b in a UE and a BS store the quantized offset levels. A processor 400b of a BS can boost the RS power for a certain layer with one of the quantized offset levels compared to data power for the certain layer, and control a transmitter 100b of the BS to transmit a UE-specific RS for the certain layer with the boosted RS power and data for the certain layer with the data power. The processor 400b of the BS can generate offset information indicating the offset level between the RS power and the data power for the certain layer, and control the transmitter 100b of the BS to transmit the offset information. A UE in the coverage of the BS can receive the UE-specific RS and the data and demodulate the data based on the UE-specific RS and the offset information. A processor 400a of the UE can mitigate the transmission power loss of the data based on the UE-specific RS and the offset information, thereby demodulating the received data to the original data the BS transmitted.

2. Second Embodiment Rank Dependent Indication

It can be defined that the RS power boosting is always used if the offset level is higher than '0.' In other words, if the ratio of data power to data power is not 1, it is considered that the RS power boosting is used. In this case, the offset level may be fixed according to the transmission rank or the number of CDM groups. According to this embodiment, the offset level is predefined according to the rank or the number of CDM groups. For example, referring to Math Figure 10, the offset level can be defined as 0 for rank less than or equal to two, and −3 dB for rank greater than two. For another example, the offset level can be defined as 0 for one CDM group, and −3 dB for two CDM groups. For still another example, the offset level can be defined as −6 dB for four CDM groups.

In many cases, a BS determines the number of layers to be transmitted based on the feedback information transmitted by a UE. The UE can estimate/measure channel state/quality between the UE and the BS based on reference signals such as CRS, CSI-RS, etc. The UE can calculate a maximum number of layers the UE can receive, according to the channel state/quality, and report to the BS the maximum number of layers. The information indicating the maximum number of layers the UE can receive is referred to as rank information or rank indicator (hereinafter, RI). The BS can determine the transmission rank based on the RI, and can notify UEs in the coverage of the BS of the transmission rank. Therefore, a UE can know the offset level according to the rank in each transmission, although the offset level is explicitly informed to the UE. Accordingly, this embodiments is advantageous in that the offset level does not have to be informed separately, thereby preventing increase of transmission overhead.

According to this embodiment, a BS allocates transmission power so that the power ratio of a data RE and an RS RE for each layer is constant according to the transmission rank. Referring to FIG. 19, if a BS transmits 4 layers, the BS can allocate power to REs for each layer so that RS power level for the each layer is twice as much as data power level. A UE may assume that the ratio of data power to RS power is 1/2 since the transmission rank is 4.

The offset level fixed according to the transmission rank can be implemented in various manners. Some examples implementing the offset level fixed according to the transmission rank will be described with reference to FIGS. 20 and 21. It is assumed that the ratio of data power to RS power is 1 for rank less than or equal to 2, and 1/2 for rank greater than 2. It is also assumed that the power allocation satisfies Math FIGS. 6 and 7, and the total transmission power level γ is 1. Although the transmission rank is assumed to be 3 for convenience of description, the methods of FIGS. 20 and 21 can apply to other ranks.

Figure 20:
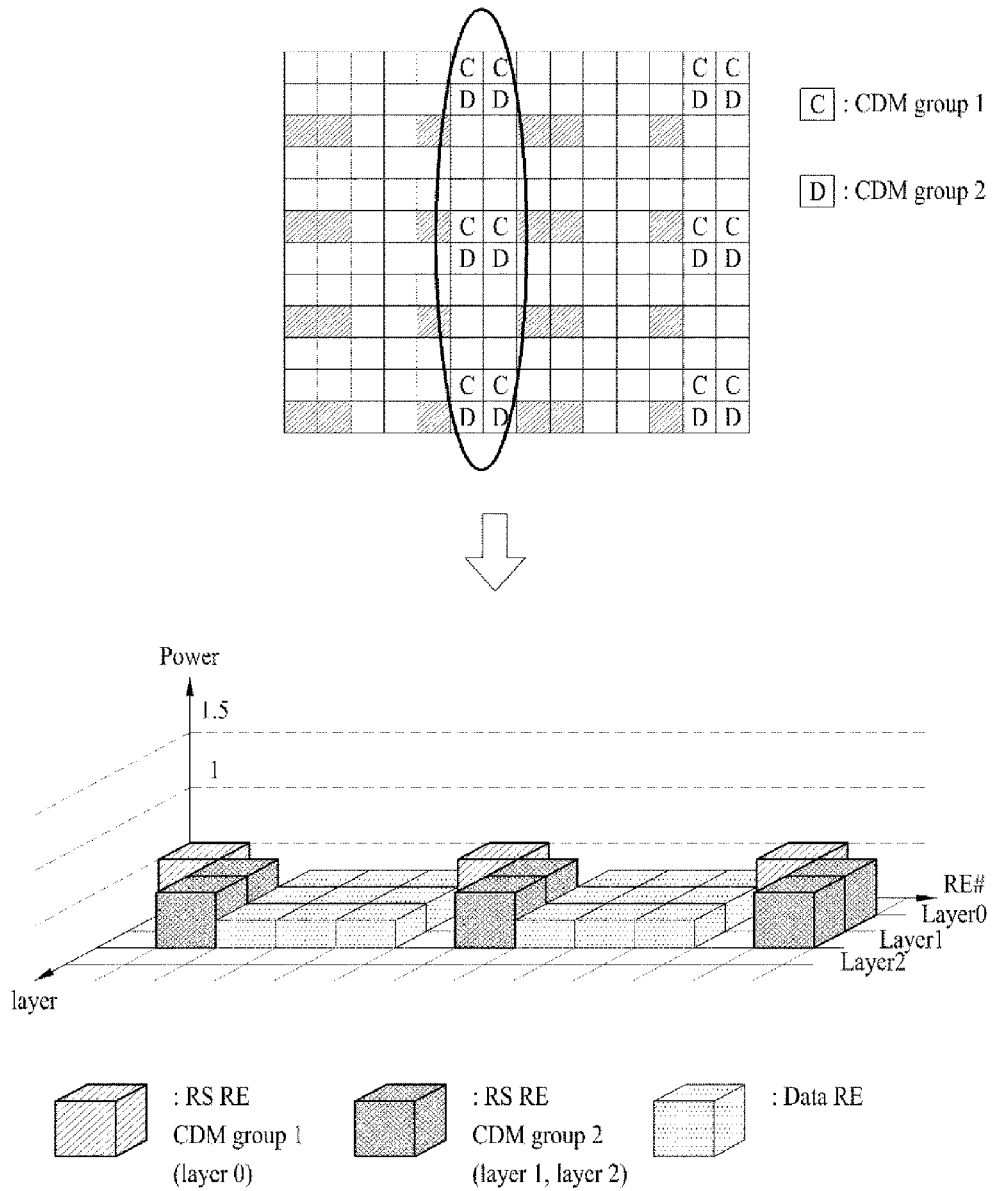
FIGS. 20 and 21 illustrate examples of power allocation for UE-specific RS REs and data REs when the transmission rank is 3.
Figure 21:
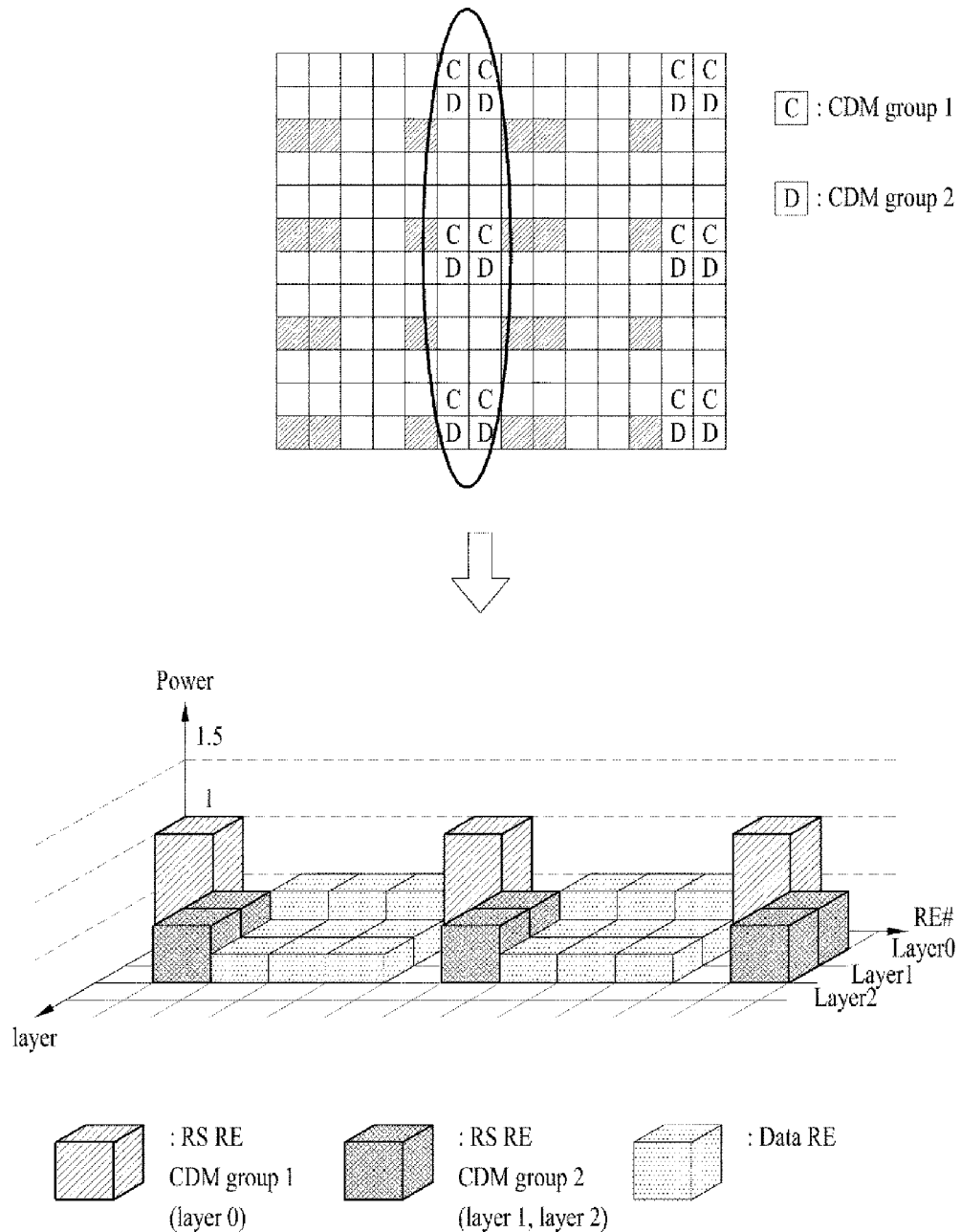

FIGS. 20 and 21 illustrate examples of power allocation for UE-specific RS REs and data REs when the transmission rank is 3.

For one example, if the maximum number of layers multiplexed in one RS RE is $N_{max}$ for transmission rank R, the RS power for each layer can be determined by Math Figure 12

$$\beta_i = \frac{\gamma}{N_{max}} \text{ where } i = 0, 1, \ldots, R. \qquad [\text{Math. 12}]$$

The data power for each layer can be determined by MathFigure 13

$$\alpha_i = \beta_i \times \text{offset where } i=0,1,\ldots,R \qquad [\text{Math.13}]$$

where the offset denotes the predefined ratio of the data power to the RS power.

Referring to FIG. 17, $N_{max}$ for transmission rank 2 is 2, so $\beta_i=1/2$. Assuming that the ratio of data power to RS power is predefined to be 1 for rank less than or equal to 2, the RS power is not boosted compared to the data power.

Referring to FIG. 20, $N_{max}$ for transmission rank 3 is 2, so $\beta_i=1/2$. Assuming that the ratio of data power to RS power is predefined to be 1/2 for rank greater than 2, the RS power is boosted twice as much as the data power so that the ratio of the data power to the RS power is 1/2. In other words, the RS power is boosted with 3 dB compared to the data power.

For another example, if the number of layers multiplexed in a CDM group k is $N_{R,k}$, the RS power of each layer in the CDM group k can be determined by Math Figure 14

$$\beta_i = \frac{\gamma}{N_{R,k}} \text{ where } i = 0, 1, \ldots, R. \qquad [\text{Math. 14}]$$

The data power for each layer can be determined by MathFigure 15

$$\alpha_i = \beta_i \times \text{offset where } i=0,1,\ldots,R \qquad [\text{Math.15}]$$

where the offset denotes the predefined ratio of the data power to the RS power.

Referring to FIG. 17, $N_{R,1}$ for the CDM group 1 is 2, so $\beta_i=1/2$. Assuming that the ratio of data power to RS power is predefined to be 1 for rank less than or equal to 2, the RS power is not boosted compared to the data power.

Referring to FIG. 20, $N_{max}$ for transmission rank 3 is 2, so $\beta_i=1/2$. Assuming that the ratio of data power to RS power is predefined to be 1/2 for rank greater than 2, the RS power is boosted twice as much as the data power so that the ratio of the data power to the RS power is 1/2. In other words, the RS power is boosted with 3 dB compared to the data power.

Referring to FIG. 21, $N_{R,1}$ for the CDM group 1 is 1, so $\beta_i=1$ for the CDM group 1. $N_{R,2}$ for the CDM group 2 is 2, so $\beta_i=1/2$ for the CDM group 2. aAssuming that the ratio of data power to RS power is predefined to be 1/2 for rank greater than 2, the data power for CDM group 1 is 1/2 and the data power for CDM group 2 is 1/4. The ratio of data power to RS power is constant across the layers 0 to 3.

The implementation methods described with reference to FIGS. 20 and 21 are exemplary. As far as the ratio of data power to RS power is constant according to the transmission rank, other methods can be applied.

A processor 400b of a BS can allocate transmission power so that the ratio of data power of a layer to RS power of the layer is constant according to the transmission rank. For example, the processor 400b of the BS can allocate transmission power so that the ratio of data power of a certain layer to RS power of the certain layer is 1 when the transmission rank is 1 or 2, and 1/2 when the transmission rank is higher than 2. Under the control of the processor 400b of the BS, a transmitter 100b of the BS can transmit a UE-specific RS and data corresponding to the certain layer with the allocated power through an antenna port corresponding to the certain layer. A receiver 300a of a UE can receive the UE-specific data and the data transmitted by the BS and modulate the received data based on the UE-specific RS and the transmission rank. The UE knows the transmission rank, since the UE would have fed back the rank information to the BS before or the BS would report the transmission rank to the UE by PDCCH or higher layer signaling. The UE may assume that the ratio of data power of a certain layer to RS power of the certain layer is a certain value based on the transmission rank. For example, a processor 400a of the UE may assume that the ratio of data power of a certain layer to RS power of the certain layer is 1 when the transmission rank is 1 or 2, and 1/2 when the transmission rank is higher than 2. The processor 400a of the UE can perform demodulation for the received layer based on the UE-specific RS and the ratio of data power to RS power.

The second embodiment can be described in relation with a PDSCH transmission, as follows. A BS can transmit one or more PDSCHs for transmitting one or more codewords. The BS determine data transmission power of a layer per RE on which a PDSCH is mapped and RS transmission power of a UE-specific RS of the layer per RE on which at least one UE-specific RS is mapped, so that a ratio of the data transmission power to the RS transmission power which is predefined according to rank is satisfied. For example, the ratio of the data transmission power to the RS transmission power is 1 for rank less than or equal to two and 1/2 for rank greater than two. The ratio of the data transmission power to the RS transmission power should be satisfied in at least each OFDM symbol containing UE-specific RS(s) for a corresponding PDSCH. One or several layers can be used for transmitting the PDSCH. A UE-specific RS may be transmitted per layer through an antenna port. The transmission power can be assigned per antenna port, and each antenna port can transmit a corresponding layer's PDSCH data and a corresponding UE-specific RS. When an antenna port transmits a certain layer and a UE-specific RS for the certain layer, the antenna port transmits the certain layer with a corresponding data transmission power in a data RE and the UE-specific RS for with a corresponding RS transmission power in an RS RE.

Under control of a processor 400b of the BS, a transmitter 100b of the BS transmit at least one PDSCH and at least one UE-specific RS for the at least one PDSCH. The processor 400b of the processor can determine data transmission power of a layer per RE on which a PDSCH is mapped and RS transmission power of a UE-specific RS per RE on which at least one UE-specific RS is mapped. In determining the data transmission power and the RS transmission power, the processor 400b of the BS maintains a ratio of the data transmission power to the RS transmission power, which is predefined according to rank indicating a number of layers being transmitted, within each OFDM symbol. One or several layers can be used for transmitting the PDSCH. A UE-specific RS may be transmitted per layer through an antenna port. The processor 400b of the BS can determine/assign transmission power per antenna port. The processor 400b of the BS can control each antenna port 500b to transmit a corresponding layer's PDSCH data and a corresponding UE-specific RS with the determined transmission power. When an antenna port 500b of the BS transmits a certain layer and a UE-specific RS for the certain layer, the antenna port 500b can transmit the certain layer with a corresponding data transmission power in a data RE and the UE-specific RS for with a corresponding RS transmission power in an RS RE.

A UE receives at least one PDSCH and at least one UE-specific reference signal (RS) for the at least one PDSCH from the BS. The UE can demodulate each layer of the PDSCH based on a corresponding UE-specific RS for the each layer and a ratio of data transmission power to RS transmission power corresponding to a rank. The UE would already know the ratio because the ratio is predefined according to rank. For example, the UE may demodulate the received PDSCH with assuming that the ratio of the data transmission power to the RS transmission power is 1 for rank less than or equal to two and 1/2 for rank greater than two.

A receiver 300a of the UE receives the at least one PDSCH and the at least one UE-specific reference signal (RS) from the BS. Assuming that a demodulator is included in a processor 400a of the UE, the processor 400a of UE can demodulate each layer of the PDSCH by using a corresponding UE-specific RS for the each layer and a ratio of data transmission power to RS transmission power predefined according to rank indicating a number of layers transmitted by the BS. A memory 200a of the UE may store the ratio predefined according to rank. The processor 400a of the UE can demodulate the received PDSCH with assuming that the ratio of the data transmission power to the RS transmission power is constant within an OFDM symbol containing the at least one UE-specific RS. For example, the processor 400a of the UE can demodulate the received PDSCH with assuming that the ratio of the data transmission power to the RS transmission power is 1 for rank less than or equal to two and 1/2 for rank greater than two.

According to the first and second embodiments, a UE knows the offset level implicitly or explicitly, and can mitigate transmission power loss based on the offset level. However, according to the embodiments above, full power transmission can be restricted because the offset level between data power and RS power should be satisfied.

In the mean time, the first and second embodiments can be applied differently according to whether an OFDM symbol contains a UE-specific RS. For example, it is possible that power for REs of an OFDM symbol containing a UE-specific RS is allocated in accordance with the first or second embodiment, and power for REs of an OFDM symbol not containing the UE-specific RS is allocated according to other restriction. The power for REs in an OFDM symbol not containing a UE-specific RS can be allocated so that the data power in the OFDM symbol not containing a UE-specific RS is constant. According to the first and second embodiments, at least the ratio of data power and RS power for a certain layer should be constant within each OFDM symbol(s) containing a UE-specific RS.

RS Power Stealing with Power Ratio Indication

3. Third Embodiment

To allow full power transmission, the power in an RS RE can be shared with data RE since the larger number of layers is multiplexed in a data RE. In this case, the data power can be different according to OFDM symbol since some OFDM symbol does not contain a UE-specific RS so that there is no power to be stolen from a UE-specific RS RE. Hereinafter, $\delta_i$ represents the power level of layer i in a data RE of the OFDMA symbol not containing a UE-specific RS.

Figure 22:
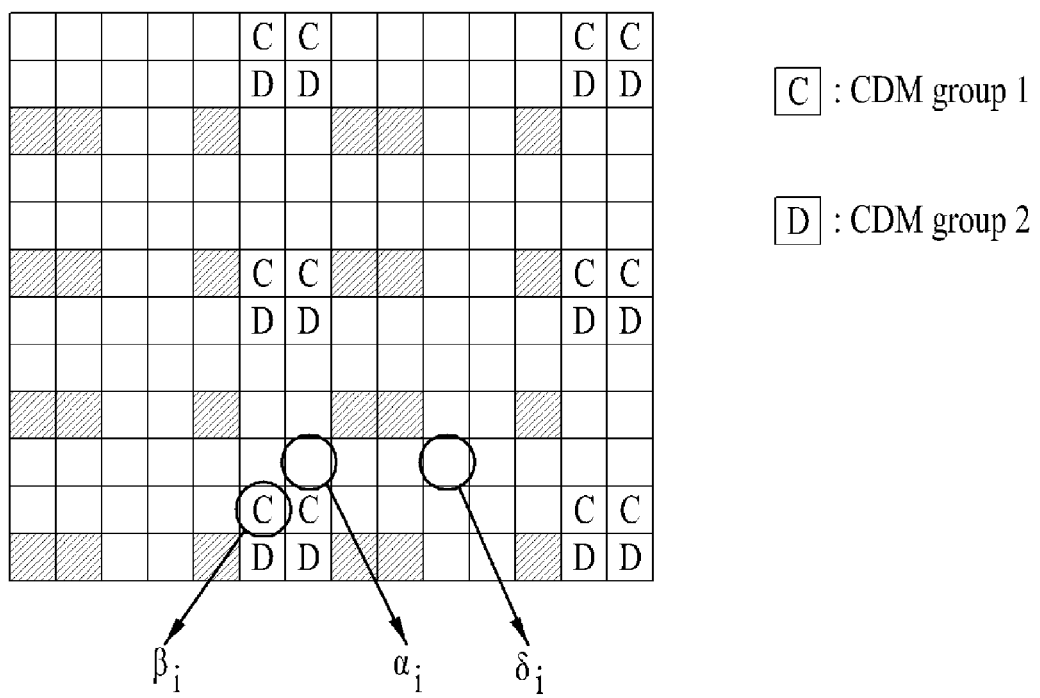
FIG. 22 illustrates an example of power allocation for UE-specific RS REs and data REs according to RS power stealing embodiment of the present invention.

FIG. 22 illustrates an example of power allocation for UE-specific RS REs and data REs according to RS power stealing embodiment of the present invention.

Referring to FIG. 22, the power of each layer in a data RE can be different according to OFDM symbol. However, $\alpha_i=\beta_i$ (i=0,1,2,3) can be satisfied by stealing power of RS RE so that full power transmission is possible in an OFDM symbol containing RS RE. In this case, the same power is allocated per RE in an OFDM symbol containing a UE-specific RS. Since $\alpha_i=\beta_i$ is satisfied, the offset indication is not necessary. A UE may perform demodulation with assuming that the ratio of data power to RS power is 1 within each OFDM symbol containing a UE-specific RS. According to this embodiment, the RS power imbalance among layers can be solved, too.

However, the different between $\alpha_i$ and $\delta_i$ may have to be informed to a UE since the mitigation level for mitigating transmission power loss is different according to OFDM symbols. The ratio between $\alpha_i$ and $\delta_i$ can be informed to a UE by PDCCH and/or higher layer signaling. Or the power ratio between $\alpha_i$ and $\delta_i$ can be predefined according to the transmission rank as the similar manners described in the second embodiment. In this case, a BS may not transmit the information indicating the ratio between $\alpha_i$ $\delta_i$ to a UE.

A processor 400b of a BS can allocate power to data REs in an OFDM symbol containing a UE-specific RS with stealing power of RS REs in the OFDM symbol. In other words, the processor 400b of a BS can allocate power to data REs and RS REs in an OFDM symbol containing a UE-specific RS so that data power $\alpha_i$ for a layer i is equal to RS power $\beta_i$ for the layer i. In order to achieve full power transmission in an OFDM symbol not containing a UE-specific RS, the processor 400b of the BS may allocate different power $\delta_i$ for the layer i in REs in the OFDM symbol not containing a UE-specific RS. In this case, the processor 400b of the BS may generate offset information indicating the ratio between $\alpha_i$ and $\delta_i$, and control a transmitter 100b of the BS to transmit the offset information to a UE. If the ratio between $\alpha_i$ and $\delta_i$ is predefined according to transmission rank, the offset information may not be transmitted. A processor 400a of the UE may demodulate the layer i with assuming that the ratio of data power to RS power in each OFDM symbol containing a UE-specific RS is 1. The processor 400a of the UE can determine the ratio of data power to RS power in each OFDM symbol containing a UE-specific RS based on the offset information or the transmission rank, and demodulate layer i transmitted in the OFDM symbol not containing a UE-specific RS.

According to the present invention, the power ratio between a UE-specific RS RE and a data RE or the power ratio between a data RE in an OFDM symbol containing a UE-specific RS and a data RE in an OFDM symbol not containing a UE-specific RS is informed to a UE explicitly or implicitly. Therefore, a UE can recognize the power level difference between data power and RS power, and mitigate the intensity of the data signal based on the UE-specific RS. The present invention will improve system throughput in a wireless system adopting higher transmission rank and and/or improve system coverage by allowing full power transmission.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

Industrial Applicability

The embodiments of the present invention can be applied to a base station, a mobile station, or other communication device in a wireless communication system.

The invention claimed is:

1. A method for transmitting, by a base station (BS), a downlink signal to a user equipment (UE) comprising:
    allocating data transmission power for downlink data and reference signal (RS) transmission power for at least one UE-specific RS for the downlink data based on a ratio X/Y of data transmission power X to RS transmission power Y; and
    transmitting the downlink data and the at least one UE-specific RS according to the data transmission power X and the RS transmission power Y to the UE,
    wherein the data transmission power X is corresponding to power per layer a data resource element (RE) on which the downlink data is mapped, and the RS transmission power Y is corresponding to power per UE-specific RS in a RS RE on which the at least UE-specific RS is mapped, and
    wherein the ratio X/Y of data transmission power X to RS transmission power Y is predefined to be "1" in case that a number of layers used for transmission of the downlink data is less than or equal to two and predefined to be a specific value less than "1" in case that the number of layers is greater than two.

2. A base station (BS) configured to transmit a downlink signal to a user equipment (UE) comprising:
    a transmitter configured to transmit downlink data and at least one UE-specific reference signal for the downlink data; and
    a processor, operatively coupled to the transmitter, configured to allocate data transmission power for the downlink data and reference signal (RS) transmission power for at least one UE-specific, RS based on a ratio X/Y of data transmission power X to RS transmission power Y; and control the transmitter to transmit the downlink data and the at least one UE-specific RS according to the data transmission power X and the RS transmission power Y to the UE,
    wherein the data transmission power X is corresponding to power per layer in a data resource element (RE) on which the downlink data is mapped, and the RS transmission power Y is corresponding to power per UE-specific RS in a RS RE on which the at least one UE-specific RS is mapped, and
    wherein the ratio X/Y of data transmission power X to RS transmission power Y is predefined to be "1" in case that a number of layers used for transmission of the downlink data is less than or equal to two and predefined to be a specific value less than "1" in case that the number of layers is greater than two.

3. A method for receiving, by a user equipment (UE), a downlink signal from a base station (BS) comprising:
    receiving downlink data and at least one UE-specific reference signal (RS) for the downlink data from the base station (BS); and
    demodulating the downlink data based on the at least UE-specific RS and a ratio X/Y of data transmission power X to RS transmission power Y,
    wherein the data transmission power X is corresponding to power per layer in a data resource element (RE) on which the downlink data is mapped, and the RS transmission power Y is corresponding to power per UE-specific RS in a RS RE on which the at least one UE-specific RS is mapped, and
    wherein the ratio X/Y of data transmission power X to RS transmission power Y is predefined to be "1" in case that a number of layers used for transmission of the downlink data is less than or equal to two and predefined to be a specific value less than "1" in case that the number of layers is greater than two.

4. A user-equipment (UE) configured to receive a downlink signal from a base station (BS) comprising:
    a receiver configured to receive downlink data and at least one UE-specific reference signal (RS) for the downlink data from the (BS); and
    a processor, operatively coupled to the receiver, configured to demodulate the down link data based on the at least one UE-specific RS and a ratio X/Y of data transmission power X to RS transmission power Y,
    wherein the data transmission power X is corresponding to power per layer in a data resource element (RE) on which the downlink data is mapped, and the RS transmission power Y is corresponding to power per UE-specific RS in RS RE on which the at least one UE-specific RS is mapped, and
    wherein the ratio X/Y of data transmission power X to RS transmission power Y is predefined to be "1" in case that a number of layers used for transmission of the downlink data is less than or equal to two and predefined to be a specific value less than "1" in case that the number of layers is greater than two.

5. The method of claim 1, wherein the specific value is "1/2".

6. The BS of claim 2, wherein the specific value is "1/2".

7. The method of claim 3, wherein the specific value is "1/2".

8. The UE of claim 4, wherein the specific value is "1/2".

* * * * *